(12) United States Patent
Watanabe et al.

(10) Patent No.: US 7,660,369 B2
(45) Date of Patent: Feb. 9, 2010

(54) RADIO-CONTROLLED METHOD AND DEVICE FOR MEASURING TIME

(75) Inventors: Takamoto Watanabe, Nagoya (JP); Sumio Masuda, Shizuoka-ken (JP)

(73) Assignee: DENSO CORPORATION, Kariya (JP)

( * ) Notice: Subject to any disclaimer, the term of this patent is extended or adjusted under 35 U.S.C. 154(b) by 557 days.

(21) Appl. No.: 11/699,576

(22) Filed: Jan. 30, 2007

(65) Prior Publication Data
US 2007/0177690 A1   Aug. 2, 2007

(30) Foreign Application Priority Data
Feb. 1, 2006 (JP) ............... 2006-024670

(51) Int. Cl.
    *H03D 3/22* (2006.01)
(52) U.S. Cl. .................... 375/332; 375/324
(58) Field of Classification Search ........... 375/316, 375/324, 329–332, 340
See application file for complete search history.

(56) References Cited

U.S. PATENT DOCUMENTS

| 5,283,532 A | | 2/1994 | Burkhart et al. |
| 5,440,267 A | * | 8/1995 | Tsuda et al. ............. 329/308 |
| 5,490,177 A | | 2/1996 | La Rosa et al. |
| 5,732,105 A | | 3/1998 | Andren et al. |
| 2005/0047526 A1 | | 3/2005 | Watanabe et al. |

FOREIGN PATENT DOCUMENTS

| DE | 42 19 417 A1 | 12/1993 |
| DE | 696 15 769 T2 | 2/1997 |
| EP | 0 518 086 A2 | 5/1992 |
| JP | 2001-108770 | 4/2001 |
| JP | 2003-060520 | 2/2003 |
| JP | 2005-102129 | 4/2005 |

OTHER PUBLICATIONS

"TAD Digital Quadrature Detection and its Application to the Receiver Circuit for the LF Standard Time and Frequency Signal" by S. Masuda et al.; The Horological Institute of Japan: Sep. 2, 2005; pp. 19-22 (w/partial English translation).
"TAD Digital Quadrature Detection and its Application to the Receiver Circuit for the LF Standard Time and Frequency Signal" by S. Masuda et al.; The Horological Institute of Japan, vol. 49, No. 193; Sep. 28, 2005; pp. 28-37.
Office Action dated Aug. 25, 2008 in corresponding German patent application No. 10 2007 004 902.3-31 (and English translation).

* cited by examiner

*Primary Examiner*—Emmanuel Bayard
(74) *Attorney, Agent, or Firm*—Posz Law Group, PLC

(57) ABSTRACT

In a radio-controlled device for measuring time, a demodulating unit demodulates the time information from the received electric signal based on amplitude information of the target radio wave. The amplitude information is obtained from in-phase and quadrature-phase components of the target radio wave. A phase calculator calculates phase data associated with a phase of the target radio wave based on the in-phase and quadrature-phase components. A variability calculator calculates a variability of the phase data of the target radio wave relative to a reference phase. The reference phase changes at a constant rate in time according to a frequency error. The frequency error is contained in the reference signal relative to a frequency of the target carrier wave. A reception determining unit determines whether reception of the radio-controlled device is good based on the calculated variability.

13 Claims, 19 Drawing Sheets

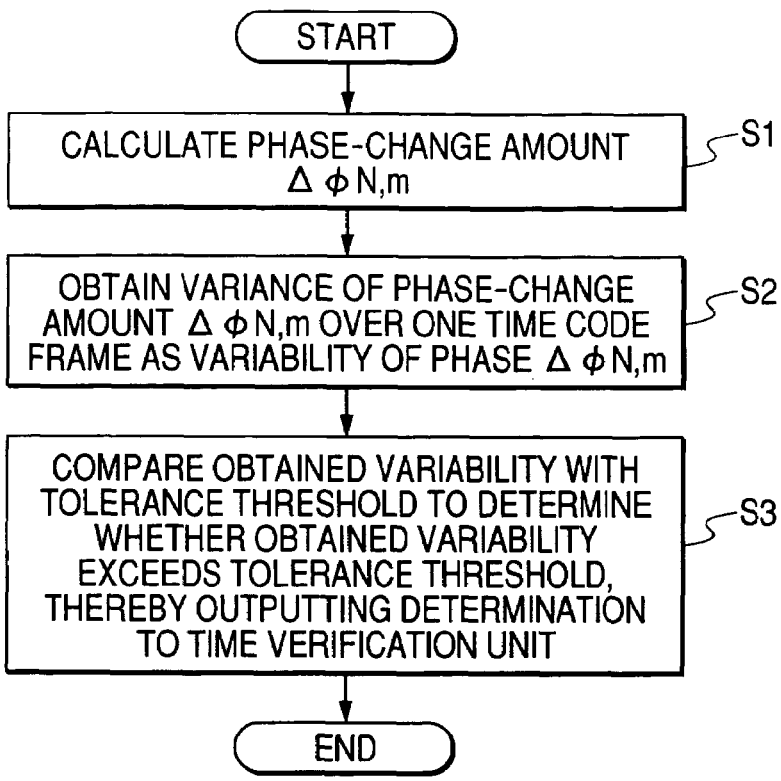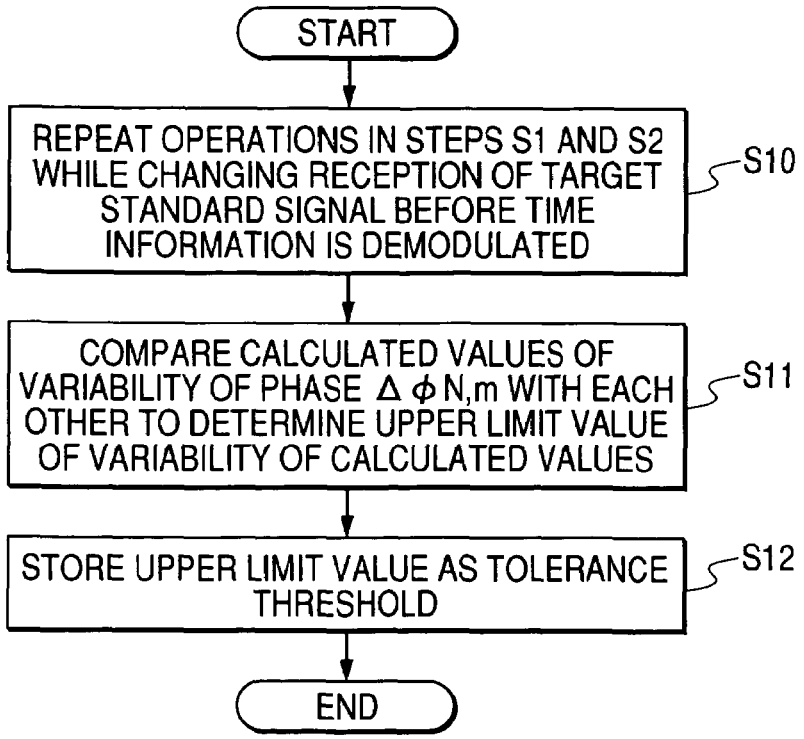

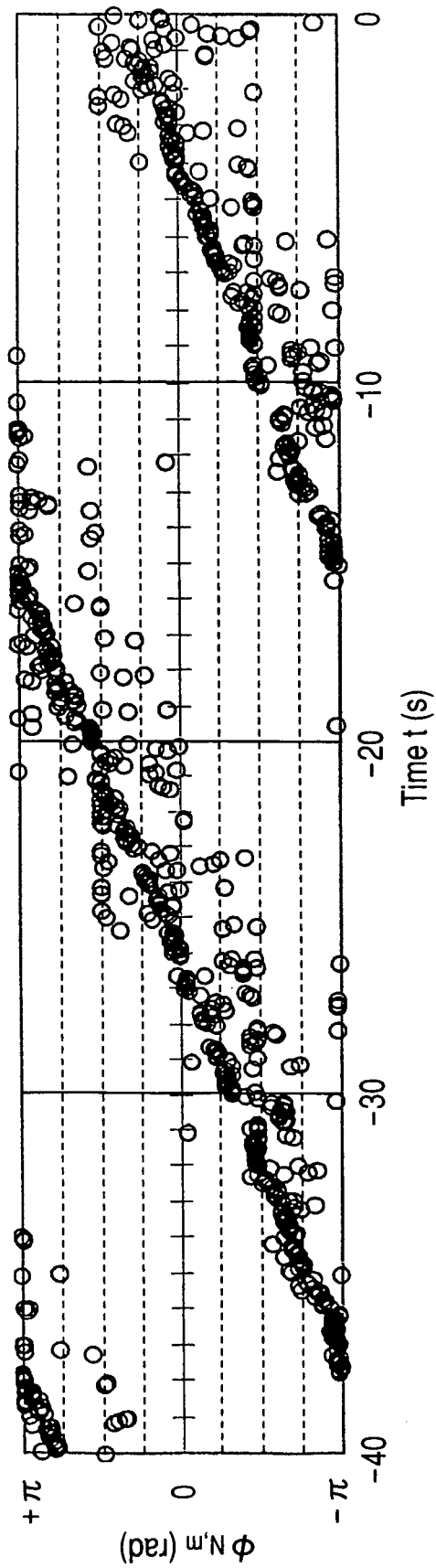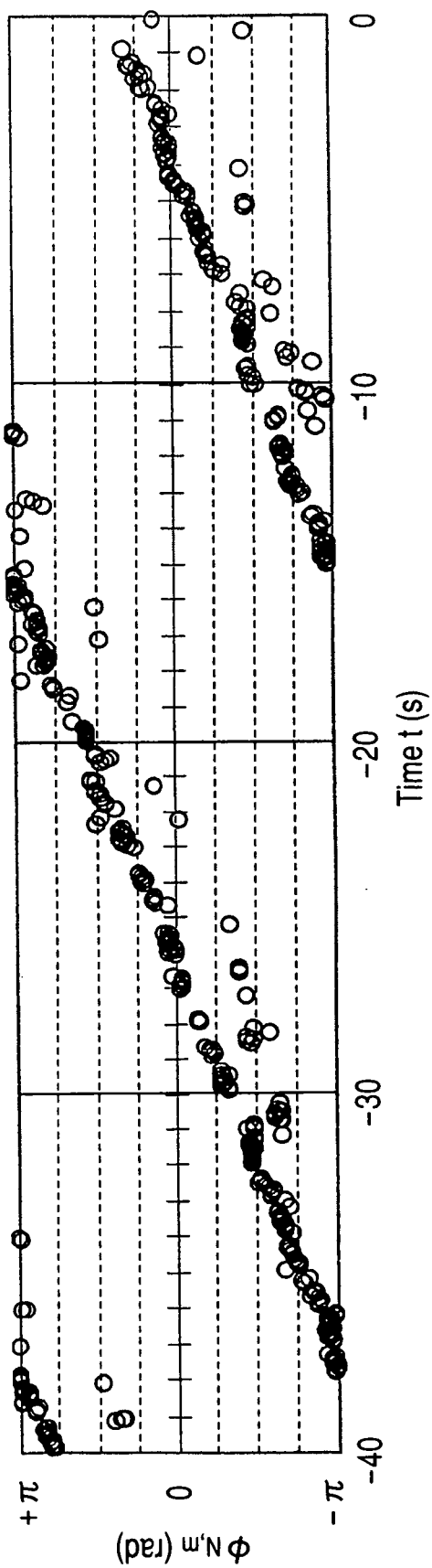

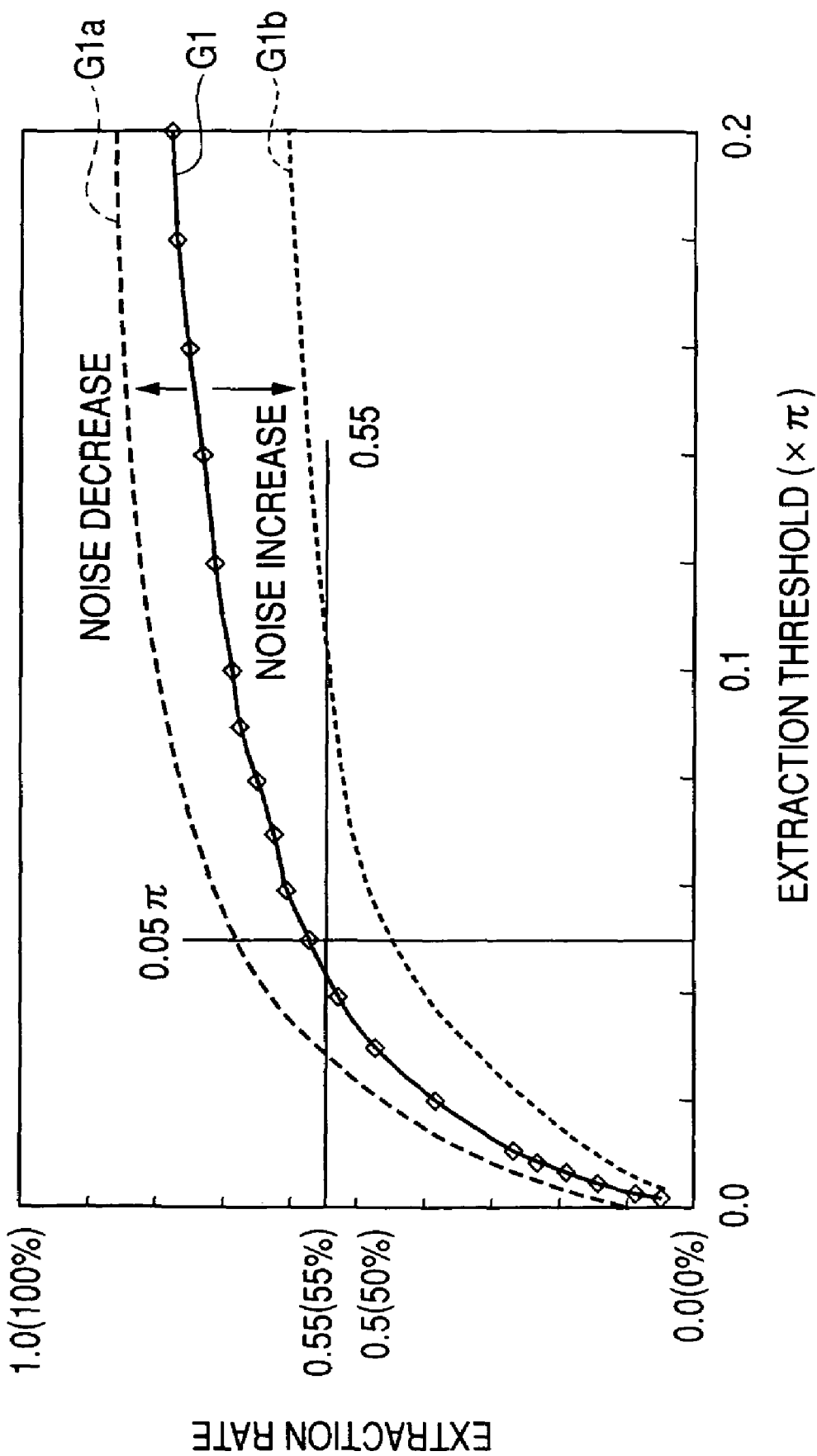

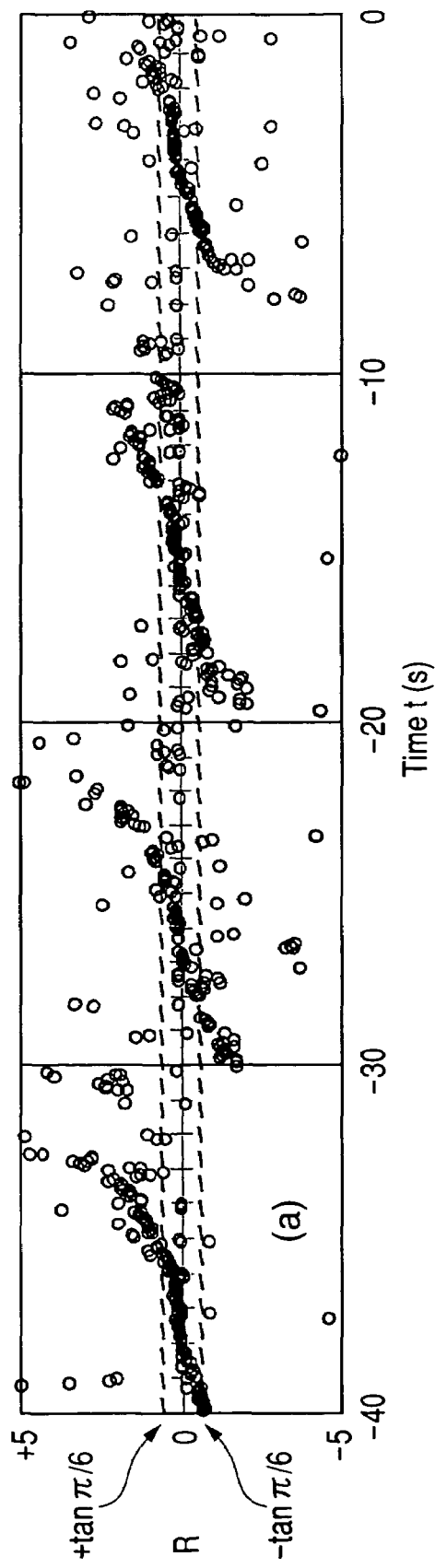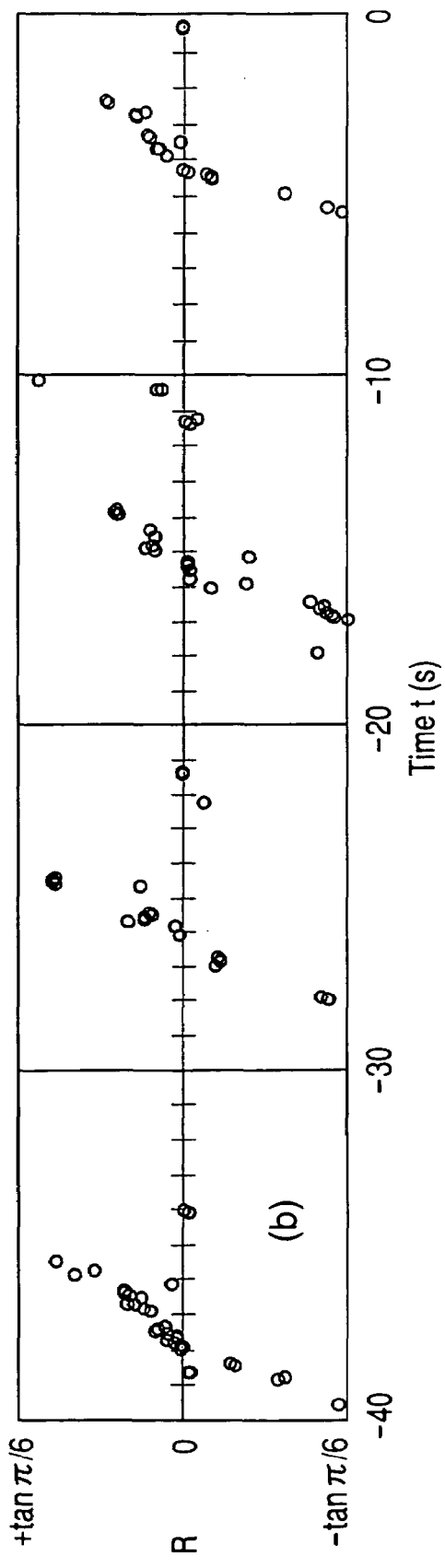
FIG. 19A
FIG. 19B

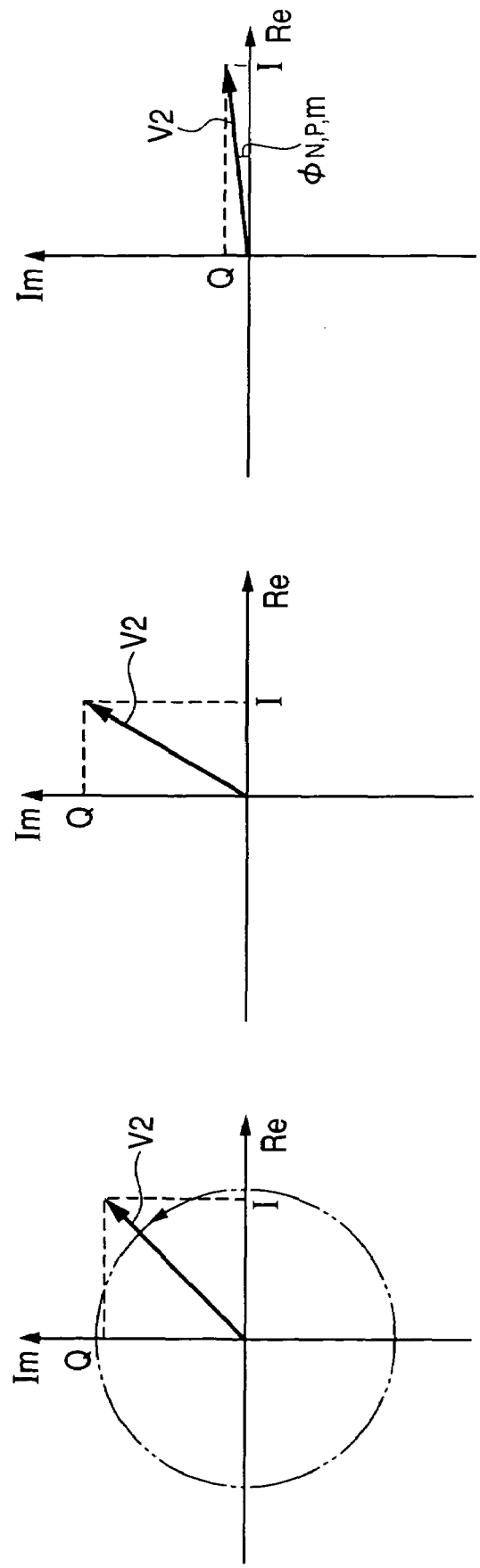

RADIO-CONTROLLED METHOD AND DEVICE FOR MEASURING TIME

CROSS REFERENCE TO RELATED APPLICATIONS

This application is based on Japanese Patent Application 2006-024670 filed on Feb. 1, 2006. This application claims the benefit of priority from the Japanese Patent Application, so that the descriptions of which are all incorporated herein by reference.

FIELD OF THE INVENTION

The present invention relates to radio-controlled methods and devices for measuring time, such as clocks or watches. More particularly, the present invention relates to radio-controlled methods and devices for measuring time, which are capable of correcting a measured time based on time information extracted from at least one of radio waves broadcasted from the predetermined transmitters if the radio-controlled devices can receive good the at least one of the radio waves. The predetermined transmitters include the NIST (National Institute of Standards and Technology) station in the USA, the MSF station in United Kingdom, the DCF 77 station in Europe, and the Communication Research Laboratory (CRL) in Japan. The predetermined transmitters broadcast the radio waves on which official time and frequency standards for their corresponding countries are modulated, respectively.

BACKGROUND OF THE INVENTION

Conventional radio-controlled clocks are designed to receive a radio wave amplitude-modulated by time information serving as an official time and frequency standard for a corresponding country; this radio wave is continuously broadcasted from a transmitter located in a time zone where the clocks are used.

The conventional radio-controlled clocks are also designed to demodulate the time information, and correct a measured time based on the demodulated time information. An example of the conventional radio-controlled clock is disclosed in Japanese Unexamined Patent Publication No. 2003-60520.

Specifically, a radio-controlled clock includes an internal oscillator, such as an internal quartz oscillator, and a measuring circuit operative to measure a time based on the oscillator frequency (reference frequency), receive the time information on the radio wave broadcasted from a transmitter, and periodically correct a measured time based on the time information.

If the oscillator frequency (reference frequency) contains a frequency error with respect to the correct frequency, an error contained in a measured time would increase over time. For this reason, a radio-controlled clock is designed to periodically correct a measured time based on the received time information serving as an official time and frequency standard, thereby keeping a measured time to the right time.

Typically, the quartz oscillator frequency is within a few parts per million of the correct frequency, which means it can keep time to within 1 second for a few days or more. Therefore, the correction once per day or a few days make the clock appear to be on the right second.

The time information consists essentially of a time code with a predetermined frame format. The time code includes 60 bits of information, broadcasted at 1 bit per second. Specifically, the time code frame is broadcasted from a transmitter every 60 seconds (1 minute).

For example, in Japan, the time code bits are generated by riding and lowering the power (amplitude) of a carrier wave whose frequency is 60 kHz or 40 kHz with a modulation range of 90% (the ratio of the high amplitude and low amplitude is 10:1.

If there is bad radio reception (low S/N ratio in radio waves), the time information is not always demodulated accurately. For this reason, in order to prevent a measured time from being corrected based on inaccurately demodulated time information, verification of demodulated time information is carried out, which is disclosed for example in Japanese Unexamined Patent Publication NO. 2001-108770.

Specifically, as the first check means, for each of the demodulated time code frames, it is checked whether the time code bits meet a predetermined time code format for each time code frame. When it is checked that the time code bits in a demodulated time code frame do not meet the predetermined time code format, it is determined that an error arises in the demodulated time code frame.

As the second check means, a parity is computed for at least part of the time code bits in a current demodulated time code frame, and that is computed for at least part of the time code bits in the next current demodulated time code frame.

Then, it is checked whether the parity of the current demodulated time code is matched with that of the next demodulated time code frame.

When it is checked that the parity of the current demodulated time code frame is mismatched with that of the next demodulated time code frame, it is determined that an error arises in at least one of the current and the next demodulated time code frames.

As the third check means, some bits allocated for "minutes" between two of demodulated continuous time code frames are compared with each other to check whether increment of some bits allocated for "minutes" between two of the demodulated continuous time code frames corresponds to one minute.

When it is checked that increment of some bits allocated for "minutes" between two of the demodulated continuous time code frames does not correspond to one minute, it is determined that an error arises in at least one of the two of the demodulated continuous time code frames.

If it is determined that an error arises in a demodulated time code frame based on any one of the first to third check means, correction of a measured time based on the error-detected time code frame is prevented.

As described above, the second and third check means need to receive at least two continuous time code frames. This takes a few minutes and more to correct a measured time because a time code frame is broadcasted from a transmitter every 60 seconds (1 minute). This may increase power consumption of processes except for the normal time measuring process based on the reference frequency.

Especially, in battery-powered radio-controlled clocks, the power-consumption increase may decrease a life of the battery.

In addition, in order to execute the second and third check means, at least two continuous time code frames need to be properly received by a radio-controlled clock. For this reason, when a radio-controlled clock is put in a place where there is bad radio reception, correction of a measured time may have not been carried out for a long period of time. This may make it difficult for the radio-controlled clock to properly measure time.

SUMMARY OF THE INVENTION

In view of the background, an object of a first aspect of the present invention is to provide radio-controlled methods and devices for measuring time, which are capable of determining whether correction of a measured time is accurately carried out, whereby to prevent a measured time from being improperly corrected when reception of the radio-controlled devices is bad.

Another object of a second aspect of the present invention is to provide radio-controlled methods and devices for measuring time, which are capable of immediately checking demodulated time information from a radio standard wave.

In addition, a further object of a third aspect of the present invention is to provide radio-controlled methods and devices for measuring time, which are capable of reducing an error between a measured time and the correct time even if correction of a measured time has not been carried out for a long period of time.

According to one aspect of the present invention, there is provided a radio-controlled device for measuring time. In the radio-controlled device, a reference signal generator is configured to generate a cyclic reference signal. A time measuring unit is configured to measure a time based on a frequency of the generated cyclic reference signal. A receiving unit is configured to receive, as a target electric signal, a target radio wave on which time information indicative of an official time standard is superimposed. The target radio wave is generated by amplitude modulating a target carrier wave with the time information.

A quadrature detector is configured to extract an in-phase component and a quadrature-phase component of the target radio wave from the received target electric signal every a period of time corresponding to at least one cycle of the reference signal. A demodulating unit is configured to demodulate the time information from the received electric signal based on amplitude information of the target radio wave. The amplitude information is obtained from the in-phase component and the quadrature-phase component of the target radio wave.

A phase calculator is configured to calculate phase data associated with a phase of the target radio wave based on the in-phase component and the quadrature-phase component calculated every the period of time. A variability calculator is configured to calculate a variability of the calculated phase data of the target radio wave relative to a reference phase. The reference phase changes at a constant rate in time according to a frequency error. The frequency error is contained in the reference signal relative to a frequency of the target carrier wave. A reception determining unit is configured to determine whether reception of the radio-controlled device is good based on the calculated variability.

According to the one aspect of the present invention, the reception determining unit allows determination of whether or not reception of the radio-controlled device is good based on the calculated variability. For this reason, it is possible for the radio-controlled device of this one aspect to prevent a measured time from being corrected based on the demodulated time information when it is determined that reception of the radio-controlled device is not good.

In a preferred embodiment of this aspect, the time information is superimposed on the target radio wave in frame, and the reception determining unit is configured to determine whether the calculated variability is equal to or less than a predetermined threshold tolerance. The radio-controlled device includes a time correcting unit configured to verify the demodulated time information in frame to determine whether the demodulated time information is proper, and correct the demodulated time information when it is determined that the calculated variability is equal to or less than the predetermined threshold tolerance, and that the demodulated time information is proper.

In the preferred embodiment of this aspect, the variability calculator is configured to perform a first process to calculate an amount of change in a first piece of the phase data currently calculated by the phase calculator relative to a second piece of the phase data. The second piece of the phase data is calculated by the phase calculator the period of time before the currently calculated first piece of the phase data. The variability calculator is configured to perform a second process to obtain, as the variability, statistical data of the calculated change amount of the first piece of the phase data over a predetermined period of time. The variability calculator is configured to perform a third process to compare the obtained variability of the first piece of the phase data with the tolerance threshold to determine whether the obtained variability of the first piece of the phase data is equal to or less than the threshold tolerance.

In the preferred embodiment of this aspect, the radio-controlled device includes a tolerance threshold setting unit. The tolerance threshold setting unit is configured to repeat the first and second processes while changing reception of the radio-controlled device on the target radio wave to obtain items of the variability. The tolerance threshold setting unit is configured to compare the obtained items of the variability with each other to determine an upper limit item of the variability in the obtained items. The tolerance threshold setting unit is configured to set the upper limit item of the variability in the obtained items as the tolerance threshold.

It is to be noted that the reference phase changes by a constant phase-change rate proportional to an error representing a difference between a frequency of the target radio wave and a positive integral multiple of a frequency of the reference signal.

It is also to be noted that, because the target radio wave is generated by amplitude modulating the target carrier wave with the time information, an actual phase of the target radio wave is randomly changed in time (see FIG. 8 described hereinafter) relative to the reference phase.

Specifically, the actual phase of the target radio wave randomly changes due to frequency components except for the frequency of the target carrier wave during periods within which the amplitude of the target radio wave is small. This is because, when frequency components except for the frequency of the target carrier wave are superimposed on the target radio wave, the phase of the target radio wave randomly changes due to the superimposed frequency components. Moreover, this is because a signal to noise ratio (S/N ratio) of the radio-controlled device decreases so that the actual phase is susceptible to noise during periods within which the amplitude of the target radio wave is small.

Specifically, in the preferred embodiment of this aspect, the threshold tolerance is determined by the tolerance setting unit based on the repeatedly obtained items of the variability. When the variability of the calculated phase data of the target radio wave is greater than the tolerance threshold, it is possible to determine that the S/N ratio of the radio-controlled device with respect to the target radio wave is deteriorated, and therefore to estimate that the demodulated time information may include errors.

Accordingly, in the preferred embodiment of this aspect of the present invention, the reception determining unit determines whether the calculated variability is equal to or less than the threshold tolerance. In addition, the time correcting unit verifies a reliability of the demodulated time information in frame to determine whether the demodulated time information is proper.

When it is determined that the calculated variability is equal to or less than the predetermined threshold tolerance, and that the demodulated time information is proper, the time correcting unit corrects the demodulated time information.

Otherwise when it is determined that the calculated variability is greater than the predetermined threshold tolerance, or that the demodulated time information is not proper, the time correcting unit prevents correction of a measured time.

As described above, the radio-controlled device allows correction of the time information during a short period of time corresponding to one frame while its verification reliability is kept as high as or higher than conventional radio-controlled devices.

As a result, even though there is a bad reception for the target radio wave, when good reception for the target radio wave has continued for just a short period of time corresponding to one time code frame, it is possible to correct the demodulated time information. This permits the possibility of correcting a measured time of the time measuring unit to increase.

In the preferred embodiment of this aspect, as described above, as the variability of the phase data associated with the phase of the target radio wave, the statistical data of the calculated change amount of the first piece of the phase data over the predetermined period of time can be used. As the statistical data, a variance of the of the calculated change amount of the first piece of the phase data over the predetermined period of time can be used. Moreover, as the statistical data, a probability that the calculated amount of the first piece of the phase data will be equal to or greater than the tolerance threshold, or that the calculated amount of the first piece of the phase data will be equal to or less than the tolerance threshold can be used.

Furthermore, as the statistical data, a residual sum of squares or a correlation function of the calculated amount of the first piece of the phase data, which is obtained by linear regression analysis of the calculated amount of the first piece of the phase data can be used.

In a preferred embodiment of this aspect, the radio-controlled device includes a time-change rate calculator configured to calculate a rate of time change in the reference phase based on pieces of the phase data calculated by the phase calculator over a period of time. The reference signal generator is configured to adjust the frequency of the reference signal so as to minimize the rate of time change in the reference signal.

In the preferred embodiment of this aspect, minimization of the rate of time change in the reference signal allows an error of the reference signal to become low as much as possible. For this reason, an accuracy of a measured time by the time measuring unit corrected based on the demodulated time information can be boosted up to its maximum level. This allows an error of a measured time by the time measuring unit relative to a correct time to be kept small even if correction of a measured time by the time measuring unit has not been executed for a long period of time.

In a preferred embodiment of this aspect, the quadrature detector includes an integrator configured to integrate the received electric signal over every quarter of one cycle of the target radio wave to generate an integration value, the integration values to be generated being represented as S1, S2, S3, S4, .... The quadrature detector includes a calculating unit configured to perform addition and subtraction on the generated integration values in accordance with the following equations to respectively calculate first components and second components:

$$I_k = S_{4k-3} + S_{4k-2} - S_{4k-1} - S_{4k}$$

$$Q_k = S_{4k-3} - S_{4k-2} - S_{4k-1} + S_{4k}$$

where $I_k$ represents the first components, the $Q_k$ represents the second components, and k=1, 2, 3, .... The quadrature detector includes an integrator configured to:

integrate each group of an N number of the first components $I_k$ in accordance with the following equation to obtain the in-phase component $I_{N,m}$:

$$I_{N,m} = \sum_{k=(m-1)N+1}^{mN} I_k$$

where m=1, 2, 3, ... ; and integrate each group of an N number of the second components $Q_k$ in accordance with the following equation to obtain the quadrature-phase component $Q_{N,m}$:

$$Q_{N,m} = \sum_{k=(m-1)N+1}^{mN} Q_k$$

This aspect of the present invention has an arrangement that the integrator includes a pulse delay circuit composed of a plurality of delay units serially connected to one another to form a plurality of stages of delay such that the received electric signal is supplied to each of the delay units. When a pulse is input to the plurality of delay units, the plurality of delay units sequentially transfer a pulse signal while delaying it. A delay time of the pulse signal by each of the delay units depends on a level of the received electric signal supplied thereto. The integrator includes a counter unit configured to count what number of stages through which the pulse signal passes every timing of quarter of one cycle of the target radio wave to obtain the count value as the integration value.

This aspect of the present invention has an arrangement that the quadrature detector is configured to start to extract, at a timing, the in-phase component and the quadrature-phase component from the received target electric signal every the period of time. The timing is associated with the reference signal. The radio-controlled device includes a timing adjusting unit operatively connected to the quadrature detector and configured to adjust the timing so as to minimize the phase data calculated by the phase calculator every the period of time. The demodulating unit is configured to use the in-phase component of the target radio wave as the amplitude information.

In a preferred embodiment of this aspect, the quadrature detector includes an integrator configured to integrate the received electric signal over every an integer submultiple of one cycle of the target radio wave to generate an integration value. The integration values to be generated are represented as S1, S2, S3, S4, .... The integer is the product of 4 and r. The r is a positive integer. The quadrature detector includes a timing-variable integrating unit configured to start to integrate, at a timing, the integration values S1, S2, S3, S4, ... in accordance with the following equation so as to generate an integrated signal every quarter of one cycle of the target radio wave. The timing is selected from a submultiple of the product of 4 and r. The submultiple is expressed by p. The timing-variable integrating unit is configured to allow change of the timing in accordance with a command, the command being configured to be sent from the timing adjusting unit:

$$S_{p,q} = \sum_{i=0}^{r-1} S_{p+(q-1)r+i}$$

where p=1, 2, ..., 4r, q=1, 2, ....

The quadrature detector includes a calculating unit configured to perform addition and subtraction on the generated signals $S_{p,q}$ in accordance with the following equations to calculate first components and second components:

$$I_{p,k} = S_{p,4k-3} + S_{p,4k-2} - S_{p,4k-1} - S_{p,4k}$$

$$Q_{p,k} = S_{p,4k-3} - S_{p,4k-2} - S_{p,4k-1} + S_{p,4k}$$

where $I_{p,k}$ represents the first components, the $Q_{p,k}$ represents the second components, and k=1, 2, 3, ....

The quadrature detector includes an integrator configured to integrate each group of an N number of the first components $I_{p,k}$ in accordance with the following equation to obtain the in-phase component $I_{N,p,m}$:

$$I_{N,p,m} = \sum_{k=(m-1)N+1}^{mN} I_{p,k}$$

where m=1, 2, 3, ... ; and integrate each group of an N number of the second components $Q_{p,k}$ in accordance with the following equation to obtain the quadrature-phase component $Q_{N,p,m}$:

$$Q_{N,p,m} = \sum_{k=(m-1)N+1}^{mN} Q_{p,k}$$

In a preferred embodiment of this aspect, the integrator includes a pulse delay circuit composed of a plurality of delay units serially connected to one another to form a plurality of stages of delay such that the received electric signal is supplied to each of the delay units. When a pulse is input to the plurality of delay units, the plurality of delay units sequentially transfer a pulse signal while delaying it. A delay time of the pulse signal by each of the delay units depends on a level of the received electric signal supplied thereto. The integrator includes a counter unit configured to count what number of stages through which the pulse signal passes every timing of an integer submultiple of one cycle of the target radio wave. The integer is the product of 4 and r, and the r is a positive integer to obtain the count value as the integration value.

In the preferred embodiment of this aspect, it is easy to sufficiently rise a sampling frequency for which the count value is obtained as the integration value, as compared with the frequency of the target carrier wave, and to operate the integrator at the high sampling frequency.

In a preferred embodiment of this aspect, the phase calculator is configured to calculate, as the phase data, an approximate value of the phase of the target radio wave based on the in-phase component and the quadrature-phase component calculated every the period of time. The approximate value is expressed by a ratio of the quadrature-phase component to the in-phase component.

In a preferred embodiment of this aspect, as the amplitude information of the target radio wave, any one of a second power and an approximate value of an amplitude of the target radio wave is obtained from the in-phase component and the quadrature-phase component of the target electric signal.

According to another aspect of the present invention, there is provided a method of measuring time based on a target radio wave on which time information indicative of an official time standard is superimposed, in which the target radio wave is generated by amplitude modulating a target carrier wave with the time information. The method includes generating a cyclic reference signal, and measuring a time based on a frequency of the generated cyclic reference signal. The method includes receiving, as a target electric signal, the target radio wave, and extracting an in-phase component and a quadrature-phase component of the target radio wave from the received target electric signal every a period of time corresponding to at least one cycle of the reference signal.

The method also includes demodulating the time information from the received electric signal based on amplitude information of the target radio wav. The amplitude information is obtained from the in-phase component and the quadrature-phase component of the target radio wave, and calculating phase data associated with a phase of the target radio wave based on the in-phase component and the quadrature-phase component calculated every the period of time.

The method further includes calculating a variability of the calculated phase data of the target radio wave relative to a reference phase, the reference phase changing at a constant rate in time according to a frequency error. The frequency error is contained in the reference signal relative to a frequency of the target carrier wave. The method includes determining whether reception of the radio-controlled device is good based on the calculated variability.

BRIEF DESCRIPTION OF THE DRAWINGS

Other objects and aspects of the invention will become apparent from the following description of embodiments with reference to the accompanying drawings in which:

FIG. 9A is a flowchart schematically illustrating an example of operations to be carried out by a variability calculator illustrated in FIG. 1;

FIG. 9B is a flowchart schematically illustrating an example of operations to be carried out by the variability calculator;

FIG. 11A is a graph schematically illustrating temporal distributions of pieces of phase data obtained by a phase calculator illustrated in FIG. 1 when the first longwave standard signal is received by the radio-controlled device located to obtain a predetermined reference S/N ratio with respect to the first longwave standard signal;

FIG. 11B is a graph schematically illustrating temporal distributions of some pieces of the phase data that are extracted from the pieces of phase data; some of these extracted pieces of phase data meet an equation [14] described hereinafter;

FIG. 12 is a graph schematically illustrating, when a first extraction threshold for the pieces of phase data varies within a range from $0.0\pi$ to $0.2\pi$, calculated extraction rates in relation to the varied first thresholds;

FIG. 19A is a graph schematically illustrating temporal distributions of the approximate values obtained by a phase calculator illustrated in FIG. 15;

FIG. 19B is a graph schematically illustrating temporal distributions of some of the approximate values corresponding to pieces of approximate-value change amount data whose absolute values are determined to be lower than a predetermined extraction threshold;

FIG. 20A is a graph schematically illustrating an IQ vector whose real and imaginary parts correspond to an in-phase component and a quadrature-phase component obtained by a quadrature detector illustrated in FIG. 15;

FIG. 20B is a graph schematically illustrating a standstill of the IQ vector illustrated in FIG. 20A; and FIG. 20C is a graph schematically illustrating the IQ vector adjusted to stand still close to the real part axis therein.

DETAILED DESCRIPTION OF EMBODIMENTS OF THE INVENTION

Embodiments of the present invention will be described hereinafter with reference to the accompanying drawings.

First Embodiment

Figure 1:
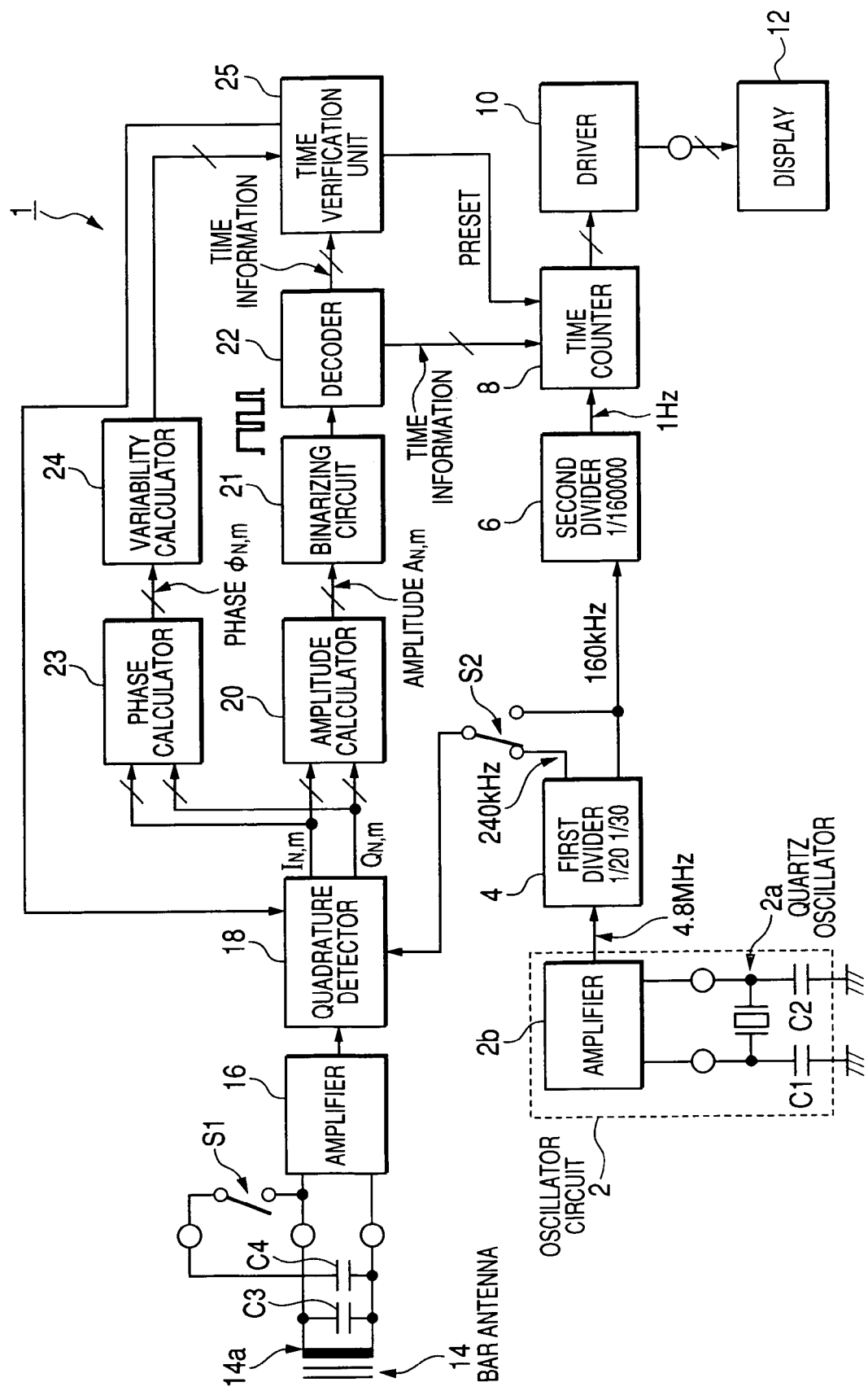
FIG. 1 is a block diagram schematically illustrating an example of the overall structure of a radio-controlled device according to a first embodiment to which the present invention is applied.

Referring to the drawings, in which like reference characters refer to like parts in several views, FIG. 1 schematically illustrates an example of the overall structure of a radio-controlled device 1 for measuring time, such as a clock, a watch, a list watch, or the like, according to a first embodiment to which the present invention is applied.

As illustrated in FIG. 1, the radio-controlled device 1 includes an oscillator circuit 2, a first divider 4 connected to the oscillator circuit 2, and a second divider 6 connected to the first divider 4. The radio-controlled device 1 also includes a time counter 8 connected to the second divider 6, a driver 10 connected to the time counter 8, and a display 12 connected to the driver 10.

The oscillator circuit 2 for example consists essentially of a quartz crystal 2a incorporating a pair of capacitors C1 and C2 and an amplifier 2b.

The amplifier 2b applies a predetermined alternating signal to the quartz crystal 2a so that the quarts crystal 2a oscillates at a predetermined constant frequency of, for example, 4.8 MHz according to the first embodiment based on predetermined capacitances of the capacitors C1 and C2, which produces an alternating signal at the constant frequency of 4.8 MHz. The oscillator circuit 2 is operative to continuously output the alternating signal to the first divider 4.

The first divider 4 is operative to:

divide the frequency of the constant frequency of the alternating signal by 30 to generate a first frequency reference signal whose frequency is 160 kHz; and divide the constant frequency of the alternating signal by 20 to generate a second frequency reference signal whose frequency is 240 kHz.

In the first embodiment, as the first frequency reference signal, a pulse signal consisting of a repetitive series of pulses with the constant frequency of 160 kHz is used. Similarly, as the second frequency reference signal, a pulse signal consisting of a repetitive series of pulses with the constant frequency of 240 kHz is used.

The second divider 6 is operative to receive one of the first and second frequency reference signals and to divide it by a predetermined number depending on the received one of the first and second frequency reference signals, thereby generating a time reference signal.

For example, in the first embodiment, the second divider 6 is operative to receive the first reference signal and to divide it by 160000, thereby generating a time reference signal whose frequency of 1 kHz.

The time counter 8 is operative to count up in synchronization with the frequency (1 kHz) of the time reference signal so as to measure a current time. The display 12 consists essentially of an LCD (Liquid Crystal Display). The driver 10 is operative to display a current time based on the count value of the time counter 8 on the display 12.

In the first embodiment, the radio-controlled device 1 is designed to be used in, for example, Japan. For this reason, the first divider 4 is operative to generate the first and second reference signals for receiving respective first and second radio waves with their low frequencies (longwaves) of 40 and 60 kHz.

The first radio wave is generated by amplitude modulating a first carrier wave having the frequency of 40 kHz with time information indicative of an official time and frequency standard for Japan. Similarly, the second radio wave is generated by amplitude modulating a second carrier wave having the frequency of 60 kHz with time information indicative of an official time and frequency standard for Japan.

The first and second radio waves with the low frequencies of 40 and 60 kHz on each of which the time information is modulated will be referred to as "first and second longwave standard signals" hereinafter.

The time information is contained in a time code with a predetermined frame format.

For example, the time code includes 60 bits of information, broadcasted at 1 bit per second. Specifically, the time code frame is broadcasted from a transmitter every 60 seconds (1 minute).

In Japan, the time code bits are generated by riding and lowering the power (amplitude) of one of the first and second carrier waves with a modulation range of 90% (the ratio of the high amplitude and low amplitude is 10:1. The amplitude-modulated radio wave corresponding to the first or second longwave standard signal is broadcasted from the CRL.

Specifically, the length of a pulse width corresponding to a high amplitude period in the first or second longwave standard signal represents a digitized value of 1 bit.

For example, 0.2 seconds (200 milliseconds) of a pulse width corresponding to the high amplitude in the first or second longwave standard signal means a position marker (separator) "P" and 0.5 seconds (500 milliseconds) of a pulse width corresponding to the high amplitude in the first or second longwave standard signal means a binary one "1". In addition, 0.8 seconds (800 milliseconds) of a pulse width corresponding to the high amplitude in the first or second longwave standard signal means a binary zero "0".

The first divider 4 is also operative to demodulate the time information from at least one of the received first and second longwave standard signals.

The frequencies of the first and second frequency reference signals to be generated by the first divider 4 are set to respective 160 kHz and 240 kHz.

The frequency of 160 kHz of the first frequency reference signal is set to be four times greater than that of 40 kHz of the first longwave standard signal, so that a cycle of the first frequency reference signal is one-quarter of that of the first longwave standard signal. Therefore, the first frequency reference signal allows generation of timing indicative of one-quarter of a cycle of the first longwave signal.

Similarly, the frequency of 240 kHz of the second frequency reference signal is set to be four times greater than that of 60 kHz of the second longwave standard signal, so that a cycle of the second frequency reference signal is one-quarter of that of the second longwave standard signal. Therefore, the second frequency reference signal allows generation of timing indicative of one-quarter of a cycle of the second longwave signal.

The radio-controlled device 1 includes a switch S2 connected to the first divider 4. The switch S2 is operative to selectively output one of the first and second frequency reference signals to a quadrature detector 18 described later.

The radio-controlled device 1 includes a bar antenna 14, an amplifier 16 connected to the bar antenna 14, and the quadrature detector 18 connected to the amplifier 16 and the switch S2.

The radio-controlled device 1 also includes an amplitude calculator 20 connected to the quadrature detector 18, a binarizing circuit 21 connected to the amplitude calculator 20, and a decoder 22 connected to the binarizing circuit 21.

The radio-controlled device 1 further includes a phase calculator 23 connected to the quadrature detector 18, a variability calculator 24 connected to the phase calculator 23, and a time verification unit 25 connected to the quadrature detector 18, the decoder 22, and the variability calculator 24.

The bar antenna 14 is composed of an antenna portion 14a consisting essentially of, for example, a core and a winding wound therearound. The antenna portion 14a works to detect, as first and second electromotive forces, the first and second longwave standard signals by electromagnetic induction.

The bar antenna 14 is composed of a capacitor C3 connected in parallel to the winding of the antenna portion 14a, and a series-connected capacitor C4 and a switch S1 connected in parallel to the winding.

The bar antenna 14 and at least one of the capacitors C3 and C4 constitute a resonant antenna (resonant circuit). Specifically, when the switch S1 is in open position, a resonant frequency of the resonant antenna of the capacitor C3 and the bar antenna 14 is determined to be 40 kHz equivalent to the frequency of the first longwave standard signal.

In contrast, when the switch Si is in close position, a resonant frequency of the resonant antenna of the capacitor C3, the capacitor C4, and the bar antenna 14 is determined to be 60 kHz equivalent to the frequency of the first longwave standard signal.

This results in that:

the first longwave standard signal with the frequency of 40 kHz can be selectively received as a first voltage signal by the resonant antenna when the switch S1 is in on state; and the second longwave standard signal with the frequency of 60 kHz can be selectively received as a second voltage signal by the resonant antenna when the switch S1 is in off state.

In the first embodiment, the first switch S1 is turned on and off with selection of the switch S2 between output of the first frequency reference signal and that of the second frequency reference signal.

Specifically, in order to receive the first longwave standard signal with the frequency of 40 kHz, the first switch S1 is turned on, and the second switch S2 is switched to select the first frequency reference signal, which allows the selected first frequency reference signal to be output to the quadrature detector 18.

In contrast, in order to receive the second longwave standard signal with the frequency of 60 kHz, the second switch S2 is turned off, and the second switch S2 is switched to select the second frequency reference signal, which allows the selected second frequency reference signal to be output to the quadrature detector 18.

The first and second switches S1 and S2 can be manually switched, or they can be connected to the time verification unit 25.

In the latter structure, the time verification unit 25 can work to supply, to the first and second switches S1 and S2, respective instructions that allow them to be desirably switched.

In the first embodiment, one of the first and second longwave standard signals to be selectively received by the bar antenna 14 will be referred to "target standard signal". Moreover, the output of the bar antenna as one of the first and second voltage signals corresponding the target standard signal will be referred to as "target voltage signal" hereinafter. In addition, one of the first and second carrier waves corresponding to the target standard signal will be referred to as "target carrier wave" hereinafter.

The amplifier 16 works to amplify the received target voltage signal output from the bar antenna 14.

The quadrature detector 18 is operative to perform quadrature detection of the target voltage signal amplified by the amplifier 16 based on one of the first and second frequency reference signals input from the first divider 4 via the second switch S2, thereby generating an in-phase component $I_{N,m}$ and a quadrature-phase component $Q_{N,m}$ of the target standard signal.

The amplitude calculator 20 is operative to calculate an amplitude $A_{N,m}$ of the target standard wave based on the in-phase component $I_{N,m}$ and the quadrature-phase component $Q_{N,m}$ generated by the quadrature detector 18.

The binarizing circuit 21 is operative to binarize the amplitude $A_{N,m}$ of the target standard wave output from the amplitude detector 20, thereby outputting binarized data.

The decoder 22 is operative to decode the binarized data output from the binarizing circuit 21, thereby demodulating the time information superimposed on the target carrier wave.

The phase calculator 23 is operative to obtain a phase $\phi_{N,m}$ of the target standard wave based on the in-phase integration value $I_{N,m}$ and the quadrature-phase $Q_{N,m}$ obtained by the quadrature detector 18.

The variability calculator 24 is operative to obtain the variability of the obtained phase $\phi_{N,m}$ of the target standard wave.

The time verification unit 25 is operative to:

verify whether the demodulated time information by the decoder 22 is proper; and output, to the time counter 8, a preset signal indicative of the demodulated time information when it is verified that the demodulated time information by the decoder 22 is proper and it is determined that the variability of the obtained phase $\phi_{N,m}$ of the target standard wave is lower than a predetermined tolerance threshold.

The time counter 8 is operative to update the count value of the time counter 8 to the demodulated time information by the decoder 22.

For example, it is assumed that the first switch S1 is in on state, and the second switch S2 is switched to select the first frequency reference signal. This permits the bar antenna 14 to selectively receive the first longwave standard signal as the target standard signal, and the first frequency reference signal to be selectively output to the quadrature detector 18.

In this assumption, when the bar antenna 14 cannot receive the first longwave standard signal well, the first switch S1 is turned off manually or by the time verification unit 25, and the second switch S2 is switched to select the second frequency reference signal manually or by the time verification unit 25. This permits the bar antenna 14 to selectively receive the second longwave standard signal as the target standard signal, and the second frequency reference signal to be selectively output to the quadrature detector 18.

As set forth above, the radio controlled device 1 according to the first embodiment is configured to automatically correct a measured time by the time counter 8 using any one of the first and second longwave standard signals as the target standard signal.

As each of the first and second carrier waves, a sinusoidal wave with a carrier frequency $f_c$ and a carrier cycle $T_c$ is used as an example of periodic waves.

The quadrature detector 18 is constructed by, for example, a plurality of CMOS digital elements, and designed to provide digital quadrature detection.

Figure 2:
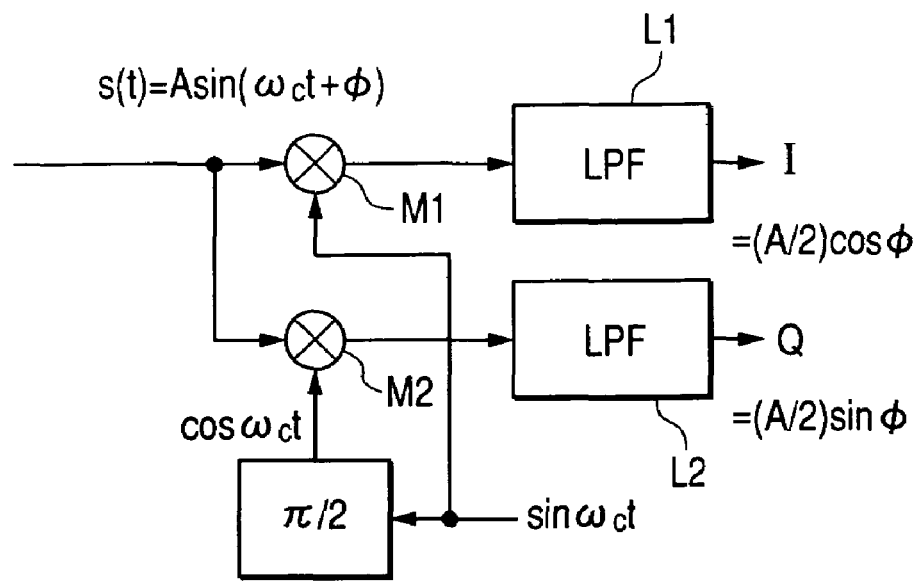
FIG. 2 is a circuit diagram schematically illustrating quadrature detection.

Quadrature detection is normally composed, as illustrated in FIG. 2 for an example, of:

a first multiplier M1 for multiplying a modulated carrier wave s(t) modulated by a baseband signal (target signal), which is represented as "s(t)=A sin(2π$f_c$t+φ)", by a sinusoidal wave (sin(2π$f_c$t));

a second multiplier M2 for multiplying the modulated carrier wave s(t) by a cosine wave (cos(2π$f_c$t)) shifted in phase from the sinusoidal wave by π/2 (radian);

a first low pass filter (LPF) L1 for allowing a low-frequency component of the multiplied carrier wave sent from the first multiplier M1 to pass therethrough while restricting the higher-frequency component thereof to generate an in-phase component I (=(A/2)cos φ); and a second low pass filter L2 for allowing a low-frequency component of the multiplied carrier wave sent from the second multiplier M2 to pass therethrough while restricting the higher-frequency component thereof to generate a quadrature-phase component Q (=(A/2)sin φ), where $f_c$ is a carrier frequency of the carrier wave, A is an amplitude of a baseband signal (modulating signal), which is unknown, and φ is a phase of the baseband signal, which is unknown.

Figure 3:
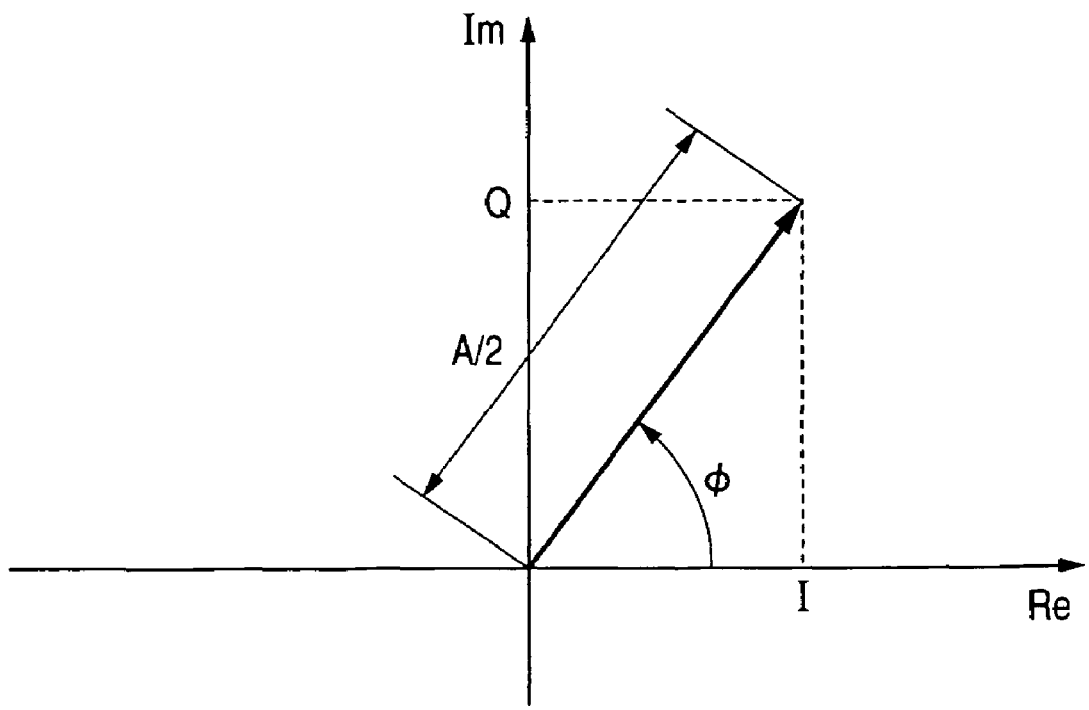
FIG. 3 is a graph schematically illustrating an in-phase component and a quadrature-phase component generated by the quadrature detection illustrated in FIG. 2.

The in-phase component I and the quadrature-phase component Q are shown on the rectangular coordinates illustrated in FIG. 3. Note that the horizontal axis (Re) represents the real part of a complex vector, and the vertical axis (Im) represents the imaginary part of the complex vector. Specifically, the in-phase component I represents the real part of the vector (A/2+jφ) shown on the complex plane as the amplitude A and the phase φ, and the quadrature-phase component Q represents the imaginary part of the vector (A/2+jφ).

Thus, obtaining the in-phase component I and the quadrature-component Q of the modulated carrier wave s(t) allows the unknown amplitude A and the unknown phase φ of the baseband signal to be calculated.

As described above, the quadrature detection has been normally carried out using analog circuits.

In the first embodiment, however, in place of the normal quadrature detection design set forth above, using the quadrature detector 18 permits the digital quadrature detection to be simply carried out.

Figure 4:
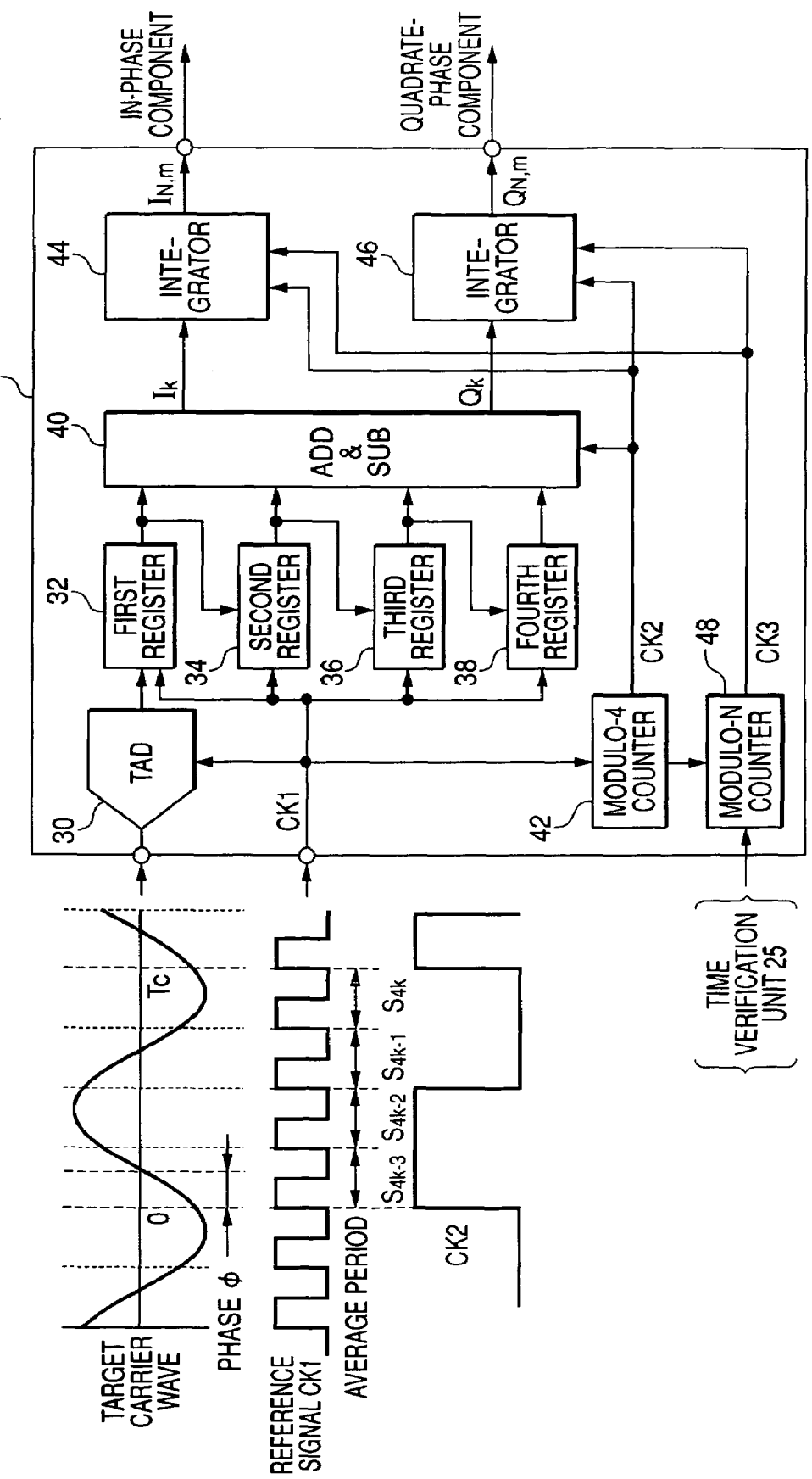
FIG. 4 is a block diagram schematically illustrating an example of the overall structure of a quadrature detector illustrated in FIG. 1.

Specifically, as illustrated in FIG. 4, the quadrature detector 18 is composed of a time analog to digital (A/D) converter 30 operative to average (integrate) the amplified target voltage signal over every cycle $T_a$, thereby obtaining an average value (integration value) $S_q$ (q=1, 2, 3, . . . ) every cycle $T_a$. The cycle (sampling cycle) $T_a$ is equivalent to one cycle of one of the first and second frequency reference signals selectively input via the switch S2 from the first divider 4.

In other words, the sampling cycle $T_a$ is equivalent to one quarter the carrier cycle $T_c$ of the target carrier wave, which is given by "$T_a=T_c/4$".

In the first embodiment, one of the first and second frequency reference signals to be selectively input from the first divider 4 via the switch S2 will be referred to as "first reference signal CK1" hereinafter. In addition, the time A/D converter will be referred to simply as "TAD" hereinafter.

The quadrature detector 18 is also composed of first to fourth registers 32, 34, 36, and 38 each with an input and an output, and an adder-subtractor 40.

In FIG. 4, the adder-subtractor 40 is simply referred to as "ADD & SUB". The input of the first register 32 is connected to an output of the TAD 30, and the output of the first register 32 is connected to both the input of the second register 34 and the adder-subtractor 40. The output of the second register 34 is connected to both the adder-subtractor 40 and the input of the third register 36, and the output of the third register 36 is connected to both the adder-subtractor 40 and the input of the fourth register 38. The output of the fourth register 38 is connected to the adder-subtractor 40.

When an average value $S_{4k-3}$ is output from the TAD 30 in synchronization with one pulse of the reference signal CK1, the average signal $S_{4k-3}$ is input to the first register 32 to be latched therein. When the next average value $S_{4k-2}$ is output from the TAD 30 in synchronization with the next pulse of the reference signal CK1, the average value $S_{4k-3}$ latched in the first register 32 is shifted to the second register 34 to be latched therein, and the average value $S_{4k-2}$ is input to the first register 32 to be latched therein.

When the next average value $S_{4k-1}$ is output from the TAD 30 in synchronization with the next pulse of the reference signal CK1, the average value $S_{4k-3}$ latched in the second register 34 is shifted to the third register 36 to be latched therein, the average value $S_{4k-2}$ latched in the first register 32 is shifted to the second register 34 to be latched therein, and the average value $S_{4k-1}$ is input to the first register 32 to be latched therein.

When the next average value $S_{4k}$ is output from the TAD 30 upon application of the next pulse of the reference signal CK1, the average value $S_{4k-3}$ latched in the third register 36 is shifted to the fourth register 38 to be latched therein, the average value $S_{4k-2}$ latched in the second register 34 is shifted to the third register 36 to be latched therein, the average value $S_{4k-1}$ latched in the first register 32 is shifted to the second register 34 to be latched therein, and the average value $S_{4k}$ is input to the first register 32 to be latched therein.

The adder-subtractor 40 is operative to sample the integration values $S_{4k-3}$ to $S_{4k}$ and to perform addition and subtraction on the four sampled integration values $S_{4k-3}$ to $S_{4k}$.

The quadrature detector 18 is further composed of a modulo-4 counter 42, first and second integrators 44 and 46 connected to the adder-subtractor 40, and a modulo-N counter 48. The modulo-4 counter 42 is connected to the adder-subtractor 40, the first and second integrators 44 and 46, and the modulo-N counter 48. The modulo-N counter 48 is connected to the first and second integrators 44 and 46. The reference signal CK1 is configured to be input to the modulo-4 counter 42.

The modulo-4 counter 42 is operative to count up from zero (initial value) in synchronization with a same-directed active edge, such as a riding edge or trailing edge, of each of the pulses of the reference signal CK1, and to reset its count value to zero in synchronization with the same-directed edge of the pulse immediately after the count value has reached 3.

This allows generation of an operation clock CK2; this operation clock CK2 consists essentially of a repetitive series of clock pulses with a constant frequency that is one quarter the frequency $f_{a\,1\,(=1/T_a)}$ of the reference signal CK1. The operation clock CK2 serves as an operation clock on which the adder-subtractor 40 operates. In other words, the cycle of the operation clock CK2 is equivalent to the carrier cycle $T_c$ of the target carrier wave. The operation clock CK2 will also be referred to as "second reference signal CK2" hereinafter.

The first and second integrators 44 and 46 are operative to individually integrate the output of the adder-subtractor 40 in accordance with, for example, different equations.

The modulo-N counter 48 is operative to count up from zero (initial value) in synchronization with a same-directed active edge (riding edge or trailing edge) of each clock pulse of the second reference signal CK2, and to reset its count value to zero in synchronization with the same-directed edge of the clock pulse immediately after the count value has reached N-1.

This allows generation of an operation clock CK3; this operation clock CK3 consists essentially of a repetitive series of clock pulses with a constant frequency that is one-Nth the constant frequency of the second reference signal CK2. The operation clock CK3 serves as an operation clock on which the first and second integrators 44 and 46 operate. In other words, the cycle of the operation clock CK3 is equivalent to the product of the carrier cycle $T_c$ of the target carrier wave and the N. It is to be noted that the N is an integer equal to or greater than 2.

Figure 5:
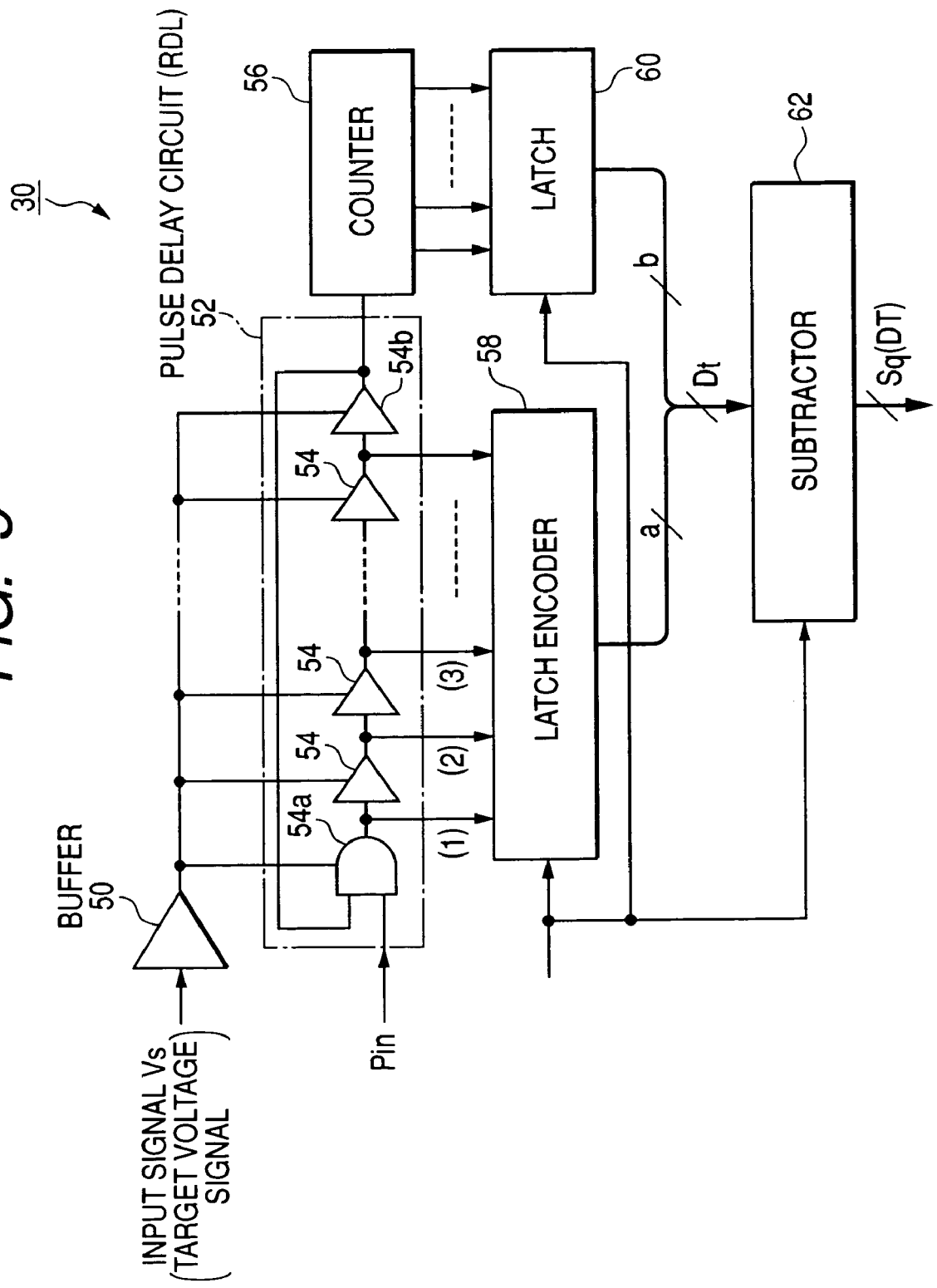
FIG. 5 is a block diagram schematically illustrating an example of the overall structure of a time analog to digital converter illustrated in FIG. 4.

The TAD 30 as illustrated in FIG. 5 includes a pulse delay circuit, in other words, a ring delay line (RDL) 52. The pulse delay circuit 52 is composed of a plurality of delay units 54 that corresponds to a plurality of stages of delay. The delay units 54 are serially connected to one another in a ring-like structure. Specifically, the first stage of the delay units 54 to which reference character "54a" is assigned is an AND gate having one and the other input terminals. A start pulse signal $P_{in}$ is configured to be input to the one input terminal of the AND gate 54a. The other input terminal of the AND gate 54a is connected to an output terminal of the final stage 54b of the delay units 54.

When the pulse signal $P_{in}$ is input to the AND gate 54a through its one input terminal, a pulse signal is sequentially transferred by the delay units 54 while being delayed thereby in the order from the AND gate 54a toward the final stage 54b of the delay units 54. When the pulse signal reaches the final stage 54b of the delay units 54, it is returned to the first stage 54a of the delay units 54 through its other input terminal. For this reason, the pulse signal is circulated through the delay units 54.

The TAD 30 includes a counter 56 connected to the output terminal of the final stage 54b of the delay units 54 and operative to count the number of times of circulation of the pulse signal through the circularly-connected delay units 54.

The TAD 30 includes a latch encoder 60 operative to:

latch a position where the pulse signal has reached at timing of a same-directed active edge, such as leading edge (or trailing edge), of each pulse of the reference signal CK1; and convert the latched position of the pulse signal Pin into predetermined bits of digital data that represent what number of stage (delay unit 54) through which the pulse signal located at the latched position lastly passes from the first stage 54a.

The TAD 30 includes a latch 60 operative to:

latch the count value of the counter 56 at timing of a same-directed active edge, such as leading edge (or trailing edge), of each pulse of the reference signal CK1; and convert the latched count value into predetermined bits of digital data.

The TAD 30 includes a subtractor 62. When the predetermined bits of digital data are input to the subtractor 62 from the latch encoder 58 as lower-order bits "a" of digital data Dt, and the predetermined bits of digital data are input thereto from the latch 60 as higher-order bits "b" of the digital data Dt, the subtractor 62 works to latch the input digital data Dt at timing of an active edge, such as leading edge (or trailing edge), of each pulse of the reference signal CK1.

The subtractor 62 also works to obtain the difference between the current latched input digital data Dt and the previous latched input digital data that has been latched one pulse before the current latched input digital data Dt, thereby outputting the obtained difference as the average value (integration value) $S_q$.

Each of the delay units 54 constituting the pulse delay circuit 52 is composed of a gate circuit consisting essentially of, for example, an inverter and/or other electronic logic gates.

The TAD 30 includes a buffer 50 to which the target voltage signal is configured to be input as an input signal $V_s$. The input signal $V_s$ (the target voltage signal) output from the amplifier 16 is configured to be applied to each of the delay units 54 as a power supply voltage.

The delay time of each delay unit 54 depends on the voltage level of the power supply voltage (the target voltage signal $V_s$) supplied to each delay unit 54. Specifically, the delay time of each delay unit 54 is inversely proportional to the voltage level of the power supply voltage (the target voltage signal $V_s$) supplied to each delay unit 54.

For this reason, the output of the subtractor 62, in other words, the data DT representing the number of delay units 54 through which the pulse signal passes within every sampling cycle $T_s$ of the reference signal CK1 is substantially proportional to the average value (integration value) $S_q$ obtained by averaging (integrating) the voltage level of the target voltage signal $V_s$ over every sampling cycle $T_s$.

It is to be noted that, for example, the input voltage range of the TAD 30 is limited within a predetermined positive range. In order to convert the power supply voltage (the target voltage signal $V_s$) that periodically oscillates positively and negatively in time into digital data, it is necessary to apply a proper DC bias to the target voltage signal $V_s$, and, thereafter, to supply it to each delay unit 54.

As set forth above, the TAD 30 has:

a first special characteristic of sequentially integrating the voltage level of the target voltage signal $V_s$ without dead time; and a second special characteristic of performing digital processing on a signal corresponding to the integrated voltage level; this digital processing includes counting operation and digitally subtracting operation using CMOS digital elements.

The first special characteristic allows execution of the digital quadrature detection on the target voltage signal $V_s$ set forth above, and the second special characteristic permits the quadrature detector 18 to be packaged together with the remaining elements of the radio-controlled device 1 on/in one chip. The package-ability of the radio-controlled device 1 makes it possible to wide the range of uses for the radio-controlled device 1.

It is to be noted that such a TAD structure has been included in, for example, U.S. Patent Publications No. U.S. Pat. No. 6,771,202 B2. Because the U.S. patent is assigned to the same assignee as that of this application, disclosures of which are incorporated herein by reference.

Figure 6:
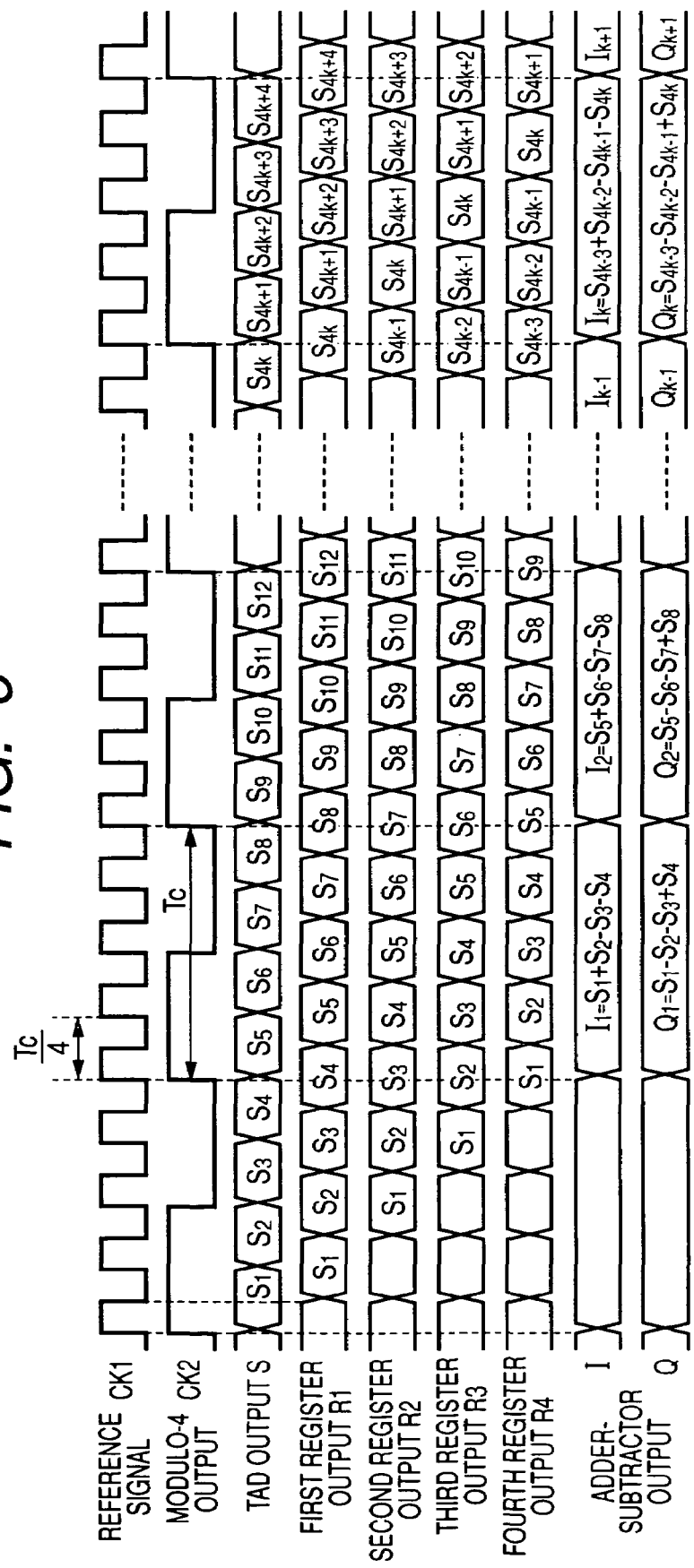
FIG. 6 is a timing chart schematically illustrating operations of the time analog to digital converter, first to fourth registers, and an adder-subtractor illustrated in FIG. 4.

As illustrated in FIG. 6, the adder-subtractor 40 executes, in accordance with the following equations [1] and [2], addition and subtraction on each set of four average values $S_{4k-3}$ to $S_{4k}$ that have been sequentially output from the TAD 30 in synchronization with the reference signal CK1 and sequentially latched in the first to fourth registers 32, 34, 36, and 38.

The executed addition and subtraction in accordance with the equations [1] and [2] allows the in-phase component $I_k$ and the quadrature-phase component $Q_k$ of the target voltage signal $V_s$ to be obtained:

$$I_k = S_{4k-3} + S_{4k-2} - S_{4k-1} - S_{4k} \quad \text{[Equation 1]}$$

$$Q_k = S_{4k-3} - S_{4k-2} - S_{4k-1} + S_{4k} \quad \text{[Equation 2]}$$

where k=1, 2, 3, . . . .

The adder-subtractor 40 repeats the addition and subtraction on the set of four average values $S_{4k-3}$, $S_{4k-2}$, $S_{4k-1}$, and $S_{4k}$ in accordance with the equations [1] and [2] every cycle of the second reference signal CK2 corresponding to the carrier cycle $T_c$ of the target carrier wave.

Each of the first and second integrators 44 and 46 integrates:

each group of an N number of sequential in-phase components $I_k$ generated by the adder-subtractor 40 to obtain an in-phase integration value $I_{N,m}$ (m=1, 2, 3, . . . ); this N is an integer equal to or greater than 1, and each group of an N number of sequential quadrature-phase components $Q_k$ generated by the adder-subtractor 40 to obtain a quadrature-phase integration value $Q_{N,m}$.

Figure 7:
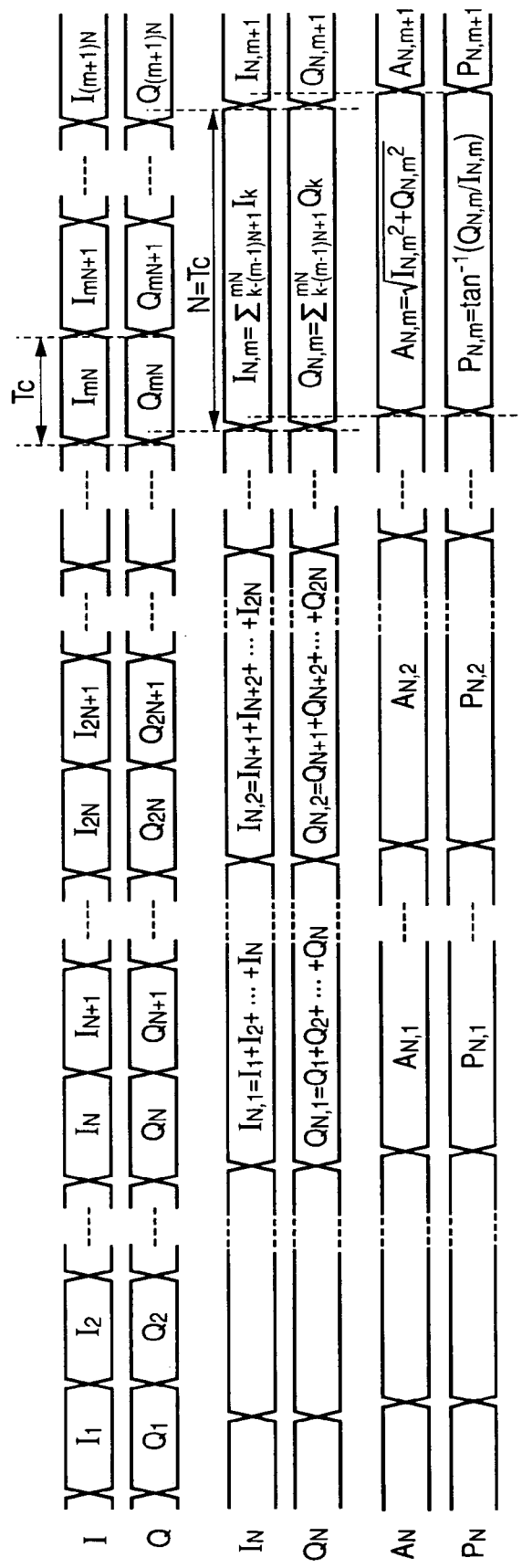
FIG. 7 is a timing chart schematically illustrating operations of the adder-subtractor illustrated in FIG. 4, first and second integrators illustrated in FIG. 4, and an amplitude calculator illustrated in FIG. 1.

Specifically, as illustrated in FIG. 7, the first integrator 44 integrates the in-phase components $I_k$ generated by the quadrature detector 18 in synchronization with a same-directed edge, such as leading edge or trailing edge, of each clock pulse of the second reference signal CK2 in accordance with the following equation [3], thereby obtaining the integration value $I_{N,m}$.

Similarly, as illustrated in FIG. 7, the second integrator 46 integrates the quadrate-phase components $Q_k$ generated by the quadrature detector 18 in synchronization with a same-directed edge, such as leading edge or trailing edge, of each clock pulse of the second reference signal CK2 in accordance with the following equation [4], thereby obtaining the integration value $Q_{N,m}$.

$$I_{N,m} = \sum_{k=(m-1)N+1}^{mN} I_k \quad \text{[Equation 3]}$$

$$Q_{N,m} = \sum_{k=(m-1)N+1}^{mN} Q_k \quad \text{[Equation 4]}$$

where m=1, 2, 3, . . . .

The first integrator 44 supplies the obtained integration value $I_{N,m}$ to the amplitude calculator 20 and the phase calculator 23 in synchronization with a same-directed edge, such as a rising edge or trailing edge, of each clock pulse of the operation clock CK3 output from the modulo-N counter 48.

Similarly, the second integrator 46 supplies the obtained integration value $Q_{N,m}$ to the amplitude calculator 20 and the phase calculator 23 in synchronization with a same-directed edge, such as a rising edge or trailing edge, of each clock pulse of the operation clock CK3 output from the modulo-N counter 48.

Specifically, the integration value $I_{N,m}$ obtained by the first integrator 44 in accordance with the equation [3] corresponds to the integration value obtained by integrating the in-phase component $I_k$ over every N number of carrier cycles $T_c$. Similarly, the integration value $Q_{N,m}$ obtained by the second integrator 46 in accordance with the equation [4] corresponds to the integration value obtained by integrating the quadrature-phase component $Q_k$ over every N number of carrier cycles $T_c$.

The integrating operations of the first and second integrators 44 and 46 allow the in-phase integration value $I_{N,m}$ and the quadrature-phase integration value $Q_{N,m}$ of the target voltage signal $V_s$ to be obtained without containing unnecessary signal components.

It is to be noted that:

the more the integration number N increases, the narrower the frequency bandwidth of the quadrature detector 18 is; and the more the integration number N increases, the more components without the detection target components containing the carrier frequency components are eliminated from the in-phase integration value $I_{N,m}$ and the quadrature-phase integration value $Q_{N,m}$.

That is, increase of the integration number N allows the obtained in-phase integration value $I_{N,m}$ and the quadrature-phase integration value $Q_{N,m}$ to approach their ideal values.

In contrast, it is to be noted that the more the integration number N increases, the longer the time resolution of the quadrature detector 18 indicative of the product of the integration number N and the carrier cycle $T_c$ is.

Thus, the integration number N can be preferably determined on the ground that the frequency bandwidth of the quadrature detector 18 and the time resolution.

In the first embodiment, the time verification unit 25 is configured to set the upper limit (N−1) of the count value of the modulo-N counter 48, which determines the integration number N of the quadrature detection.

In the first embodiment, the integration number N of the quadrature detection is determined individually for the first longwave standard signal whose carrier frequency is 40 kHz and the second longwave standard signal whose carrier frequency is 60 kHz. Specifically, as the integration number N, "2000" is determined for the first longwave standard signal whose carrier frequency is 40 kHz, and "3000" for the second longwave standard signal whose carrier frequency is 60 kHz.

These allow the time resolution of the quadrature detection output to be given by "2000/40 kHz=3000/60 kHz=50 ms".

As described above, 200 milliseconds, 500 milliseconds, and 800 milliseconds of pulse widths of the high amplitude appear in each of the first and second longwave standard signals broadcasted from the CRL in Japan. Accordingly, in the first embodiment, determination of the time resolution of the quadrature detection output to 50 ms allows the pulse widths of 200 milliseconds, 500 milliseconds, and 800 milliseconds in each of the first and second longwave standard signals to be easily identified.

The amplitude calculator 20 calculates an amplitude $A_{N,m}$ of the target standard wave based on the integration value $I_{N,m}$ and the integration value $Q_{N,m}$ supplied from the quadrature detector 18 in accordance with the following equation [5]:

$$A_{N,m} = \sqrt{I_{N,m}^2 + Q_{N,m}^2} \quad \text{[Equation 5]}$$

The binarizing circuit 21 binarizes the calculated amplitude $A_{N,m}$ of the target standard wave, thereby generating binarized data.

The decoder 22 decodes the generated binarized data output from the binarizing circuit 21, thereby generating a train of pieces of data containing a plurality of bits ("1" or "0") corresponding to the time information and items of position data P. The train of pieces of data is supplied to the time verification unit 25. The decoder 21 also extracts the time information from the train of pieces of data, thereby supplying the extracted time information to the time counter 8.

The phase calculator 23 calculates a phase $\phi_{N,m}$ of the target standard wave based on the integration value $I_{N,m}$ and the integration value $Q_{N,m}$ supplied from the quadrature detector 18 in accordance with the following equation [6]:

$$\phi_{N,m} = \tan^{-1} \frac{Q_{N,m}}{I_{N,m}} \quad \text{[Equation 6]}$$

It is to be noted that the phase $\phi_{N,m}$ of the target standard wave to be calculated by the phase calculator 23 is determined relative to a phase of the second reference signal CK2 whose clock frequency $f_s$ is one quarter the frequency $f_a$ of the reference signal CK1 and is equivalent to the carrier frequency $f_c$ of the target carrier wave (see FIG. 4).

Because an error of the carrier frequency $f_c$ of the target carrier wave with respect to its nominal frequency is approximately equal to or lower than $10^{-11}$, the error can be assumed to be substantially zero.

In contrast, though the clock frequency $f_s$ of the second reference signal CK2 is set to be matched with the carrier frequency $f_c$ of the target carrier wave, because the clock frequency $f_s$ of the second reference signal CK2 has an error referred to as "$\epsilon$", the frequency $f_s$ of the second reference signal CK2 can be expressed by the following equation [7]:

$$f_s = f_c + (1+\epsilon) \quad \text{[Equation 7]}$$

As described above, the quadrature detector 18 integrates N cycles' sequential in-phase components $I_k$ each calculated every one cycle of the second reference signal CK2, and N cycles' sequential quadrature-phase components $Q_k$ each calculated every one cycle of the second reference signal CK2.

For this reason, time $t_{s,N}$ required for the quadrature detector 18 to perform one quadrature detecting is expressed by the following equation [8], and time $t_{c,N}$ equivalent to N carrier-cycles is expressed by the following equation [9]:

$$t_{sN} = \frac{N}{f_s} = \frac{N}{f_c(1+\varepsilon)} \quad \text{[Equation 8]}$$

$$t_{cN} = \frac{N}{f_c} \quad \text{[Equation 9]}$$

In addition, a difference $\Delta t_N$ between the time $t_{s,N}$ and the time $t_{c,N}$ are expressed by the following equation [10], and a phase difference $\Delta \phi_N$ equivalent to the difference $\Delta t_N$ is expressed by the following equation [11]:

$$\Delta t_N = \quad \text{[Equation 10]}$$
$$t_{sN} - t_{cN} = \frac{N}{f_c}\left(\frac{1}{1+\varepsilon} - 1\right) = -\left(\frac{N}{f_c}\frac{\varepsilon}{1+\varepsilon}\right) \approx -\frac{N}{f_c}\varepsilon$$

$$\Delta \phi_N = 2\pi f_c \Delta t_N = -2\pi N \frac{\varepsilon}{1+\varepsilon} \approx -2\pi N\varepsilon \quad \text{[Equation 11]}$$

where $\epsilon \ll 1$, which means $\epsilon$ is much less than 1.

In the first embodiment, the quarts crystal 2b used to generate the reference signal CK1 and the second reference signal CK2 has the error $\epsilon$ of the order of $10^{-5}$ or less. For this reason, the approximate expression of "$\epsilon/(1+\epsilon) \approx \epsilon$" used by the equations [10] and [11] is established.

Specifically, every the quadrature detector 18 performs the quadrature detection of the target voltage signal $V_s$, the phase $\phi_{N,m}$ of the target standard wave varies by the $\Delta\phi_N$ represented by the equation [11].

Thus, an amount of change in the phase $\phi_{N,m}$ of the target standard wave per unit of time, that is, a rate of change in the phase $\phi_{N,m}$ of the target standard wave, which is referred to as "$d\phi_N/dt$", is expressed by the following equation [12], and the relationship of the parameters in the equation [12] allows the following equation [13] to be established:

$$\frac{d\phi_N}{dt} = \frac{\Delta\phi_N}{t_{cN}} = -2\pi f_c \varepsilon \quad \text{[Equation 12]}$$

$$\varepsilon = -\frac{1}{2\pi f_c}\frac{d\phi_N}{dt} \quad \text{[Equation 13]}$$

The equation [12] represents that the phase $\phi_{N,m}$ of the target standard wave to be sequentially calculated by the phase calculator 23 changes by the constant phase-change rate "$-2\pi f_c \epsilon$" when the clock frequency $f_s$ of the second reference signal CK2 is mismatched with the carrier frequency $f_c$ of the target carrier wave, which means the error $\epsilon$ is not equal to 0.

In contrast, when the clock frequency $f_s$ of the second reference signal CK2 is accurately matched with the carrier frequency $f_c$ of the target carrier wave, which means the error $\epsilon$ is equal to 0, the phase $\phi_{N,m}$ of the target standard wave to be sequentially calculated by the phase calculator 23 is kept constant.

Figure 8:
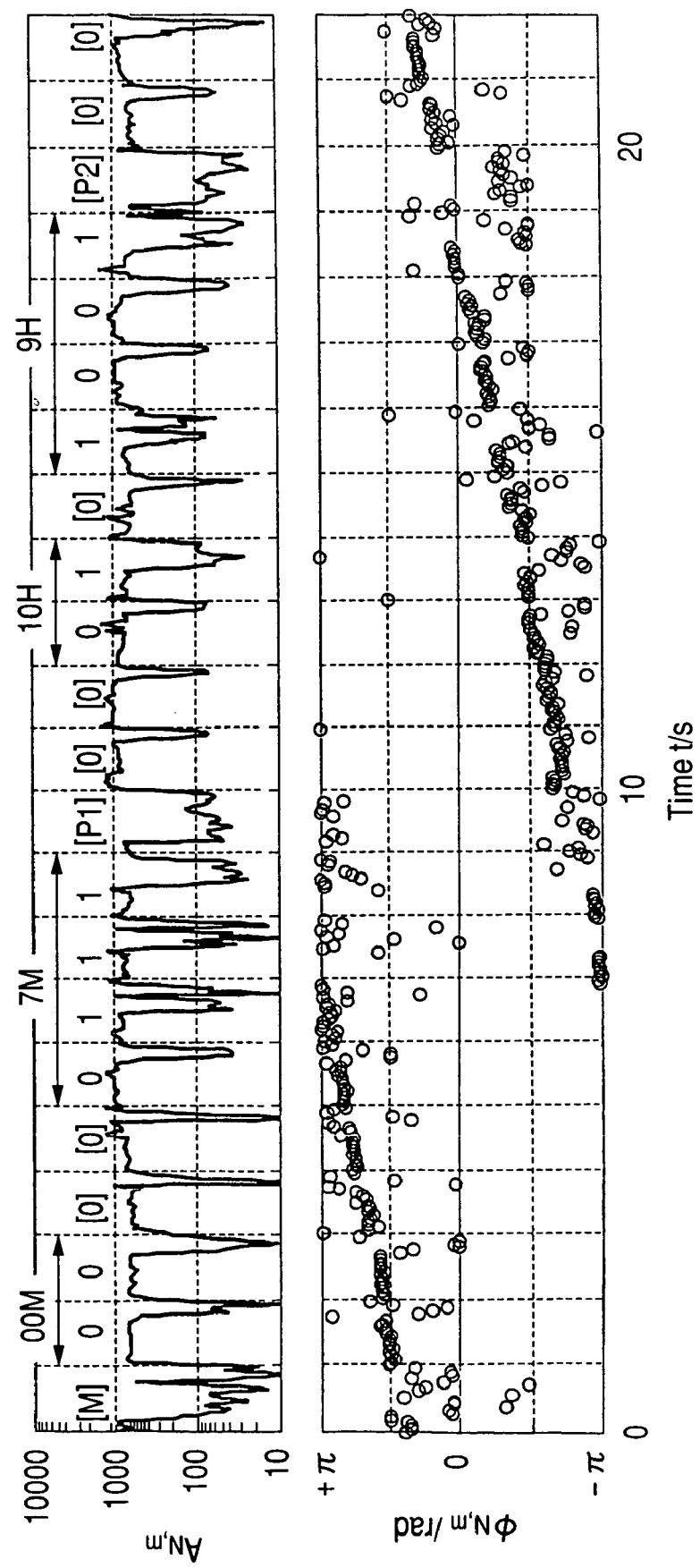
FIG. 8 is a graph schematically illustrating time-varying amplitude and phase of a first carrier wave in a first longwave standard signal according to the first embodiment.

FIG. 8 schematically illustrates the time-varying amplitude $A_{N,m}$ and phase $\phi_{N,m}$ of the first longwave standard signal corresponding to the target standard signal. While there is good reception of the first longwave standard signal enough to read the time code, the amplitude $A_{N,m}$ and the phase $\phi_{N,m}$ of the first longwave standard signal were actually obtained by an experimental arrangement based on the first longwave standard signal received thereby; this experimental arrangement imitates the radio-controlled device 1. It is to be noted that the actual first longwave standard signal receiving experiment was executed when the N is set to "2000".

From a broad view, FIG. 8 schematically illustrates that the phase $\phi_{N,m}$ of the first longwave standard signal changes in time by the constant phase-change rate $d\phi_N/dt$ substantially equal to "$\pi/10.5$ radian per second [rad/s]" when the error $\epsilon$ substantially takes $-1.2 \times 10^{-6}$.

In addition, FIG. 8 schematically illustrates that the phase $\phi_{N,m}$ of the first longwave standard signal randomly changes, due to waveform distortion of the first longwave standard signal, at points where the amplitude $A_{N,m}$ of the first longwave standard signal changes.

Moreover, FIG. 8 schematically illustrates that the phase $\phi_{N,m}$ of the first longwave standard signal (carrier wave) randomly changes, due to frequency components except for the carrier frequency $f_c$, during periods within which the amplitude $A_{N,m}$ of the first longwave standard signal is small.

Specifically, as illustrated in FIG. 8, when frequency components except for the carrier frequency $f_c$ are superimposed on the received first longwave standard signal, the phase $\phi_{N,m}$ of the first longwave standard signal randomly changes due to the superimposed frequency components.

Furthermore, the variability calculator 24 calculates the variability of the phase $\phi_{N,m}$ of the target standard wave relative to a phase thereof that changes by a constant phase-change rate proportional to the error $\epsilon$. It is to be noted that the phase of the target standard wave that changes by the constant phase-change rate proportional to the error $\epsilon$ will be referred to as "reference phase" hereinafter.

Specifically, in the first embodiment, the variability calculator 24 carries out the following operations illustrated in FIG. 9A.

In FIG. 9A, the variability calculator 24 sequentially calculates an amount $\Delta\phi_{N,m}$ of change in a currently calculated phase $\phi_{N,m}$ of the target standard wave relative to a previously calculated phase $\phi_{N,m-1}$ thereof in step S1; this phase-change amount $\Delta\phi_{N,m}$ is expressed by the equation of "$\Delta\phi_{N,m} = \phi_{N,m} - \phi_{N,m-1}$".

Next, the variability calculator 24 obtains a variance of the calculated phase-change amount $\Delta\phi_{N,m}$ over one time code frame corresponding to one minute (60 seconds) or over each of sections of one time code frame in step S2; these sections are obtained by dividing one time code frame by a given number. As a result, the variance of the phase-change amount $\Delta\phi_{N,m}$ is obtained as the variability thereof by the variability calculator 24.

Specifically, a value obtained by dividing an average of the phase-change amount $\Delta\phi_{N,m}$ by a cycle of the quadrate detection corresponding to the N carrier cycles is probably equivalent substantially to the constant phase-change rate of the phase $\phi_{N,m}$. For this reason, calculation of the variance of the phase-change amount $\Delta\phi_{N,m}$ allows the variability of the phase $\phi_{N,m}$ of the target standard wave relative to the reference phase in the target standard wave to be obtained; this reference phase changes by the constant phase-change rate.

It is to be noted that the more the variability of the phase $\phi_{N,m}$ increases, the more frequency components except for the carrier frequency $f_c$ are contained in the target voltage signal $V_s$. For this reason, even if there is good reception of the first and second longwave standard signals, the variability of the phase $\phi_{N,m}$ of the target standard wave has a certain level depending on the presence of the points where the modulation factor of the amplitude $A_{N,m}$ of the target standard wave changes; and the periods within which the amplitude $A_{N,m}$ of the target standard wave is small.

Thus, in the first embodiment, it is preferable that the calculation of the variability of the phase $\phi_{N,m}$ of the target standard wave in steps S1 and S2 are repeated by the variability calculator 24 of the radio-controlled device 1 with the reception of the device 1 on the target standard signal being changed before the time information is demodulated by the decoder 22 in step S10 of FIG. 9B.

Thereafter, the variability calculator 24 compares calculated values of the variability of the phase $\phi_{N,m}$ of the target standard wave in step S10 with each other to determine the upper limit value of the variability in the calculated values thereof in step S11. Then, the variability calculator 24 stores therein the upper limit value of the variability as a tolerance threshold in step S12.

Accordingly, in step S3 of FIG. 9A, the variability calculator 24 compares the obtained variability of the phase $\phi_{N,m}$ of the target standard wave with the tolerance threshold, thereby determining whether the obtained variability of the phase $\phi_{N,m}$ of the target standard wave exceeds the tolerance threshold based on the comparison result. The variability calculator 24 outputs the obtained determination to the time verification unit 25.

The time verification unit 25 verifies the time information in one time code frame corresponding to 1 minute demodulated by the decoder 22. Next, the time verification unit 25 outputs, to the time counter 8, the preset signal indicative of the demodulated time information when it is determined that:

there is no contradictions and errors in the demodulated time information; and the determination output from the variability calculator 24 represents that the obtained variability of the phase $\phi_{N,m}$ of the target standard wave is equal to or lower than the tolerance threshold.

The preset signal received by the time counter 8 permits the count value of the time counter 8 to be updated to the time information. This makes it possible to synchronize a measured time by the time counter 8 with the time information superimposed on the target standard signal.

It is to be noted that the time verification unit 25 for example executes:

a first verification process to check whether the time code bits in one time code frame of the demodulated time information meet a predetermined time code format corresponding to the target standard wave; and a second verification process to compute a parity (the number of "1" bits) in at least part of the time code bits of one time frame of the demodulated time information, thereby checking whether a predetermined parity in the same part of the time code bits of time information before it is broadcasted is matched with the computed parity.

Regarding the first verification process, when it is checked that the time code bits in one time code frame of the demodulated time information do not meet the predetermined time code format, the time verification unit 25 determines that a contradiction and/or an error arises in the demodulated time information. Then, the time verification unit 25 prevents output of the preset signal to the time counter 8, making it possible to prevent the count value of the time counter 8 from being updated based on abnormal time information.

For example, when some bits allocated for "hours" in one time code frame of the demodulated time information represents 25 hours and more and/or some bits allocated for "minutes" in one time code frame represents 60 minutes and more, it is determined that the time code bits in one time code frame of the demodulated time information do not meet the predetermined time code format.

Regarding the second verification process, when the predetermined parity in the at least part of the time code bits of time information before it is broadcasted is mismatched with the computed parity, it is determined that a party error arises in the time code bits of the demodulated time information.

As set forth above, the time verification unit 25 according to the first embodiment is configured to perform verification processes, such as the first and second verification processes, that are executable with respect to just one time code frame.

In addition, the time verification unit 25 causes the components for demodulating the time information from the target standard signal, such as the amplifier 16, the quadrature detector 18, the amplitude calculator 20, the binarizing circuit 21, the decoder 22, the phase calculator 23, and the variability calculator 24, to operate at regular intervals. This allows the count value of the time counter 8 to be updated to the time information demodulated from the target standard signal at regular intervals.

When causing the components to operate at regular intervals, if the time information is not input from the decoder 22 until a predetermined period of time has elapsed, the time verification unit 25 determines that no time information is detected, thereby preventing writing of time information into the time counter 8.

As described above, the radio-controlled device 1 is configured to:

calculate the variability of the phase $\phi_{N,m}$ of the target standard wave relative to the second reference signal CK2, in other words, relative to the reference phase of the target standard wave that changes by a constant phase-change rate proportional to the error $\epsilon$ of the second reference signal CK2;

determine whether the calculated variability exceeds the tolerance threshold;

verify the demodulated time information is proper;

determine whether correction of a measured time is performed in accordance with the verification result of the demodulated time information when it is determined that the calculated variability is equal to or lower than the tolerance threshold so that reception of the target standard wave is good; and prevent correction of a measured time irrespective of the verification result when it is determined that the calculated variability exceeds the tolerance threshold so that there is bad reception (low S/N ratio) for the target standard wave.

The configuration of the radio-controlled device 1 allows correction of the time information during a short period of time corresponding to one time code frame while its verification reliability is kept as high as or higher than conventional radio-controlled clocks. Such conventional radio-controlled clocks require at least two temporally adjacent time code frames to verify time information over a period of time corresponding to the at least two temporally adjacent time code frames.

As a result, even though there is a bad reception for the target standard wave, when good reception for the target standard wave has continued for just a short period of time corresponding to one time code frame, it is possible to correct the demodulated time information. This permits the possibility of correcting a measured time of the time counter 8 to increase.

The radio-controlled device 1 according to the first embodiment is designed to obtain the amplitude $A_{N,m}$ and the phase $\phi_{N,m}$ of the target standard wave using the in-phase component $I_{N,m}$ and the quadrature-phase component $Q_{N,m}$ that have been obtained by performing quadrature detection on the target voltage signal $V_s$ corresponding to the target standard wave.

In the quadrature detection, the radio-controlled device 1 is configured to utilize the TAD 30 to perform addition and subtraction on the integration values $S_q$ that have been obtained by averaging the level of the target voltage signal $V_s$ over every cycle $T_a$, thereby obtaining the in-phase component $I_{N,m}$ and the quadrature-phase component $Q_{N,m}$.

Specifically, the operations of the TAD 30, the addition and subtraction operations, and the operations for obtaining the amplitude $A_{N,m}$ and the phase $\phi_{N,m}$ of the target standard wave based on the in-phase component $I_{N,m}$ and the quadrature-phase component $Q_{N,m}$ can be easily digitized using digital elements, such as CMOS digital elements.

This allows at least the quadrature detector 18 and the subsequent stages thereof except for the display 12 to be integrated together on/in one chip, and therefore all of the components of the radio-controlled device 1 except for the bar antenna 14, the amplifier 16, and the display 12 to be integrated together on/in one chip. This makes it possible to downsize the radio-controlled device 1 and reduce the weight and the manufacturing cost thereof.

As described above, all of the components of the quadrature detector 18 can be constructed by digital elements, such as CMOS elements, that are less subject to temperature change, making it possible to constantly execute the quadrature detection independently of temperature change.

Especially, the integration of each group of an N number of sequential in-phase components $I_{N,m}$ and each group of an N number of sequential quadrature-phase components $Q_{N,m}$ is functionally equivalent to limit pass bandwidths of unwanted signal components. This bandwidth limit feature has been described in U.S. patent application Ser. No. 10,926,286. Because the U.S. patent application is assigned to the same assignee as that of this application, disclosures of which are incorporated herein by reference.

For this reason, proper selection of the integration number N permits the amplitude $A_{N,m}$ and the phase $\phi_{N,m}$ of the target standard wave to be less subject to noise. This allows maintenance of the accuracy and reliability of detection of the time information without using noise cut-off filters, which provides an advantage in downsizing and integrating the radio-controlled device 1.

In the first embodiment, the variability calculator 24 is configured to calculate a variance of the phase-change amount $\Delta\phi_{N,m}$ as the variability thereof, the present invention is not limited to the structure.

Figure 10:
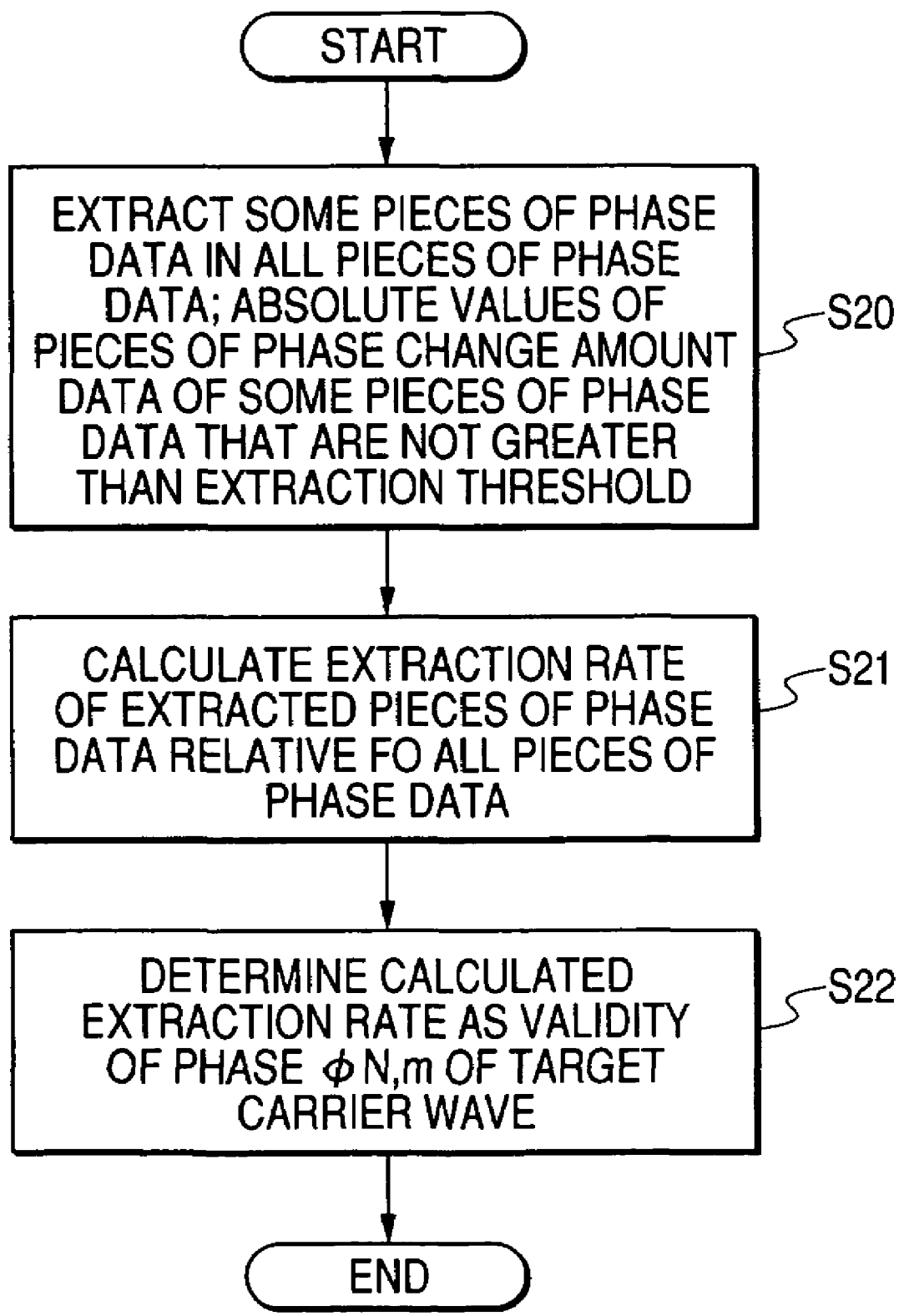
FIG. 10 is a flowchart schematically illustrating another example of operations to be carried out by the variability calculator in place of those in FIG. 9A.

Specifically, in place of the operations in FIG. 9A, as illustrated in FIG. 10, the variability calculator 24 can be configured to:

extract some pieces of the phase data $\phi_{N,m}$ in all pieces of the phase data $\phi_{N,m}$; absolute values of pieces of phase-change amount data $\Delta\phi_{N,m}$ corresponding to some pieces of the phase data $\phi_{N,m}$ are not greater than (or not less than) a predetermined extraction threshold in step S20;

calculate an extraction rate of some of the extracted pieces of the phase data $\phi_{N,m}$ relative to all pieces of the phase data $\phi_{N,m}$ in step S21; and determine the calculated extraction rate as the variability of the phase $\phi_{N,m}$ of the target standard wave in step S22.

FIG. 11A schematically illustrates temporal distributions of pieces of the phase data $\phi_{N,m}$ obtained by the phase calculator 23 when the first longwave standard signal corresponding to the first carrier wave is received by the radio-controlled device 1 located to obtain a predetermined reference S/N ratio with respect to the first longwave standard signal. In the receipt of the first longwave standard signal, the integration number N is set to 2000 so that the time resolution of the quadrature detection output of the radio-controlled device 1 is set to 50 ms.

FIG. 11B schematically illustrates temporal distributions of some of pieces of the phase data $\phi_{N,m}$ extracted from all pieces of the phase data $\phi_{N,m}$; pieces of phase-change amount data $\Delta\phi_{N,m}$ of some of the extracted pieces of the phase data $\phi_{N,m}$ meet the following equation [14]:

$$|\Delta\phi_{N,m}| \leq 0.05\pi [\text{rad/s}] \qquad [14]$$

where $0.05\pi$ represents the first extraction threshold.

The equation [14] can be converted to the following equation [15] using the equation [13]:

$$|\Delta\epsilon| \leq 1.25 \times 10^{-5} \qquad [15]$$

FIG. 12 schematically illustrates, when the first extraction threshold for the pieces of the phase data $\phi_{N,m}$ illustrated in FIG. 11A varies within the range from $0.0\pi$ to $0.2\pi$, the calculated extraction rates in relation to the varied first thresholds.

Specifically, in FIG. 12, a curve G1 represents the calculated extraction rates in relation to the varied first thresholds corresponding to the variations of the first extraction threshold when the radio-controlled device 1 has the predetermined S/N ratio.

A curve G1a represents the calculated extraction rates in relation to the varied first thresholds corresponding to the variations of the first extraction threshold when the radio-controlled device 1 has a S/N ratio higher than the reference S/N ratio.

A curve G1b represents the calculated extraction rates in relation to the varied first thresholds corresponding to the variations of the first extraction threshold when the radio-controlled device 1 has a S/N ratio lower than the reference S/N ratio.

FIG. 11B clearly shows that some of pieces of phase data $\phi_{N,m}$ each having a substantially constant phase-change ratio can be extracted by the variability calculator 24. FIG. 11B also clearly shows that regression lines of some of the extracted pieces of phase data $\phi_{N,m}$ each having a substantially constant phase-change ratio have a substantially linear gradient.

FIG. 12 clearly shows that the curves fall down with decrease of the S/N ratio of the radio-controlled device 1. In other words, increase of noise contained in the first longwave standard signal causes the calculated extraction rates in relation to the varied first thresholds to decrease.

The characteristics of the extraction rate depending on the variation in the S/N ratio of the radio-controlled device 1 allow the extraction rate to be used as an indicator for determination of the S/N ratio of the radio-controlled device 1.

For example, while the extraction threshold is set to $0.057\pi$ [rad/s], when a value as the tolerance threshold for the variability is set to 0.55 (55%), it is determined that reception of the target standard signal (first longwave standard signal) corresponding to the curve G1 illustrated in the graph of FIG. 12 is good because a value of the extraction rates corresponding to the extraction threshold of $0.05\pi$ is greater than the tolerance threshold of 0.55 (55%).

In the operations in steps S20 to S22, the variability calculator 24 extracts some pieces of the phase data $\phi_{N,m}$ in all pieces of the phase data $\phi_{N,m}$; absolute values of pieces of phase-change amount data $\Delta\phi_{N,m}$ corresponding to some pieces of the phase data $\phi_{N,m}$ are not greater than the predetermined extraction threshold. The present invention is however not limited to the structure.

Specifically, the variability calculator 24 can be configured to extract some pieces of the phase data $\phi_{N,m}$ in all pieces of the phase data $\phi_{N,m}$; absolute values of pieces of phase-change rate data corresponding to some pieces of the phase data $\phi_{n,m}$ are not greater than the predetermined extraction threshold. The absolute values of pieces of phase-change rate data are obtained by dividing the phase-change amount data $\Delta\phi_{N,m}$ by the time $t_{c,N}$ equivalent to the N carrier-cycles.

The variability calculator 24 can be configured to calculate an extraction rate of some of the extracted pieces of the phase data $\phi_{N,m}$ relative to all pieces of the phase data $\phi_{N,m}$; and determine the calculated extraction rate as the variability of the phase $\phi_{N,m}$ of the target standard wave.

These operations also allow the calculated extraction rate to be used as an indicator for determination of the S/N ratio of the radio-controlled device 1 as set forth above.

Second Embodiment

A radio-controlled device 1a according to a second embodiment of the present invention will be described hereinafter.

Figure 13:
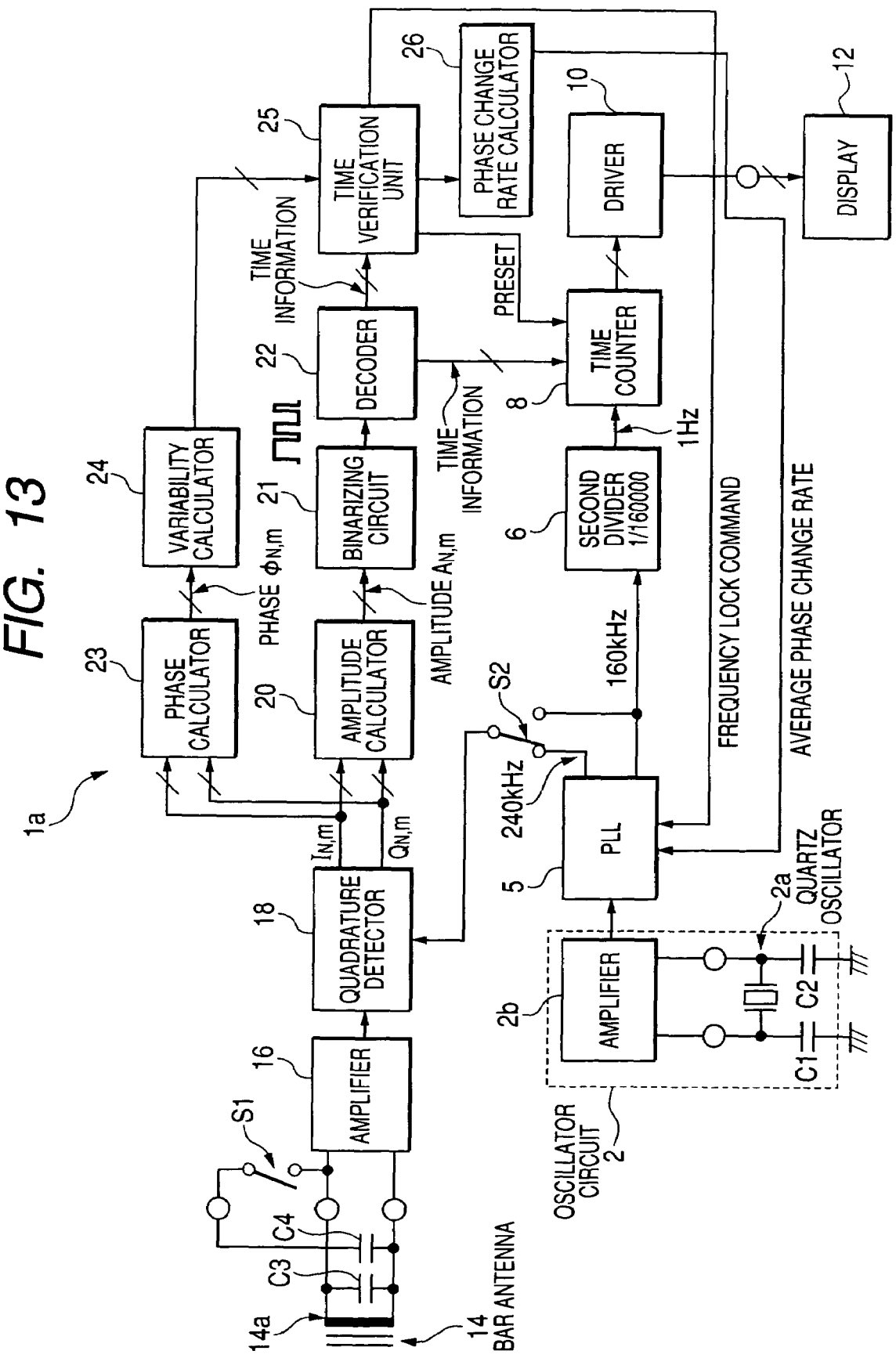
FIG. 13 is a block diagram schematically illustrates an example of the overall structure of a radio-controlled device according to a second embodiment to which the present invention is applied.

FIG. 13 schematically illustrates an example of the overall structure of the radio-controlled device 1a according to the second embodiment to which the present invention is applied.

Like reference characters are assigned to like parts in the radio-controlled devices according to the first and second embodiments. Descriptions of the like parts of the radio-controlled device according to the second embodiment will be therefore omitted, and different parts of the radio-controlled device according to the second embodiment from those according to the first embodiment will be described in detail hereinafter.

As illustrated in FIG. 13, the radio-controlled device 1a is provided with a PLL (Phase Locked Loop) circuit 5 in place of the first divider 4. The PLL circuit 5 is operative to execute the same operations as the first divider 4 to generate the first and second reference signals whose frequencies are 160 kHz and 240 kHz.

The PLL circuit 5 is also operative to adjust the frequency of the reference signal CK1 (the frequency of one of the first and second reference signals).

The radio-controlled circuit 1a is provided with a phase-change rate calculator 26 connected to the phase calculator 23 and the PLL circuit 5.

The phase-change calculator 26 is operative to obtain the rate of temporal change of the reference phase in the target standard wave based on the phase $\phi_{N,m}$ of the target standard wave sequentially calculated every N carrier cycles by the phase calculator 23; this reference phase changes by the constant phase-change rate proportional to the error ϵ of the clock frequency $f_s$ of the second reference signal CK2. The rate of temporal change of the reference phase in the target standard wave will be expressed by the reference character of "dϕ/dt" hereinafter. It is to be noted that the phase-change calculator 26 can be operative to obtain a physical quantity equivalent to the rate of temporal change of the reference phase in the target standard wave.

Specifically, in the first embodiment, the phase-change calculator 26 is operative to obtain, as the physical quantity equivalent to the rate dϕ/dt of temporal change of the reference phase in the target standard wave, an average of the phase-change amount $\Delta\phi_{N,m}$ calculated by the variability calculator 24.

The PLL circuit 5 is operative to adjust the frequency of the reference signal CK1 so that an absolute value of the rate dϕ/dt of temporal change of the reference phase in the target standard wave or the physical quantity equivalent to the rate dϕ/dt obtained by the phase-change calculator 26 becomes minimized.

The adjustment by the PLL circuit 5 is performed while it is determined that the variability of the phase $\phi_{N,m}$ of the target standard wave is equal to or lower than the tolerance threshold. In other words, the adjustment by the PLL circuit 5 is performed while it is determined that the reception of the radio-controlled device 1 on the target standard signal (target carrier signal) is good so that a frequency lock command is input to the PLL circuit 5.

Figure 14B:
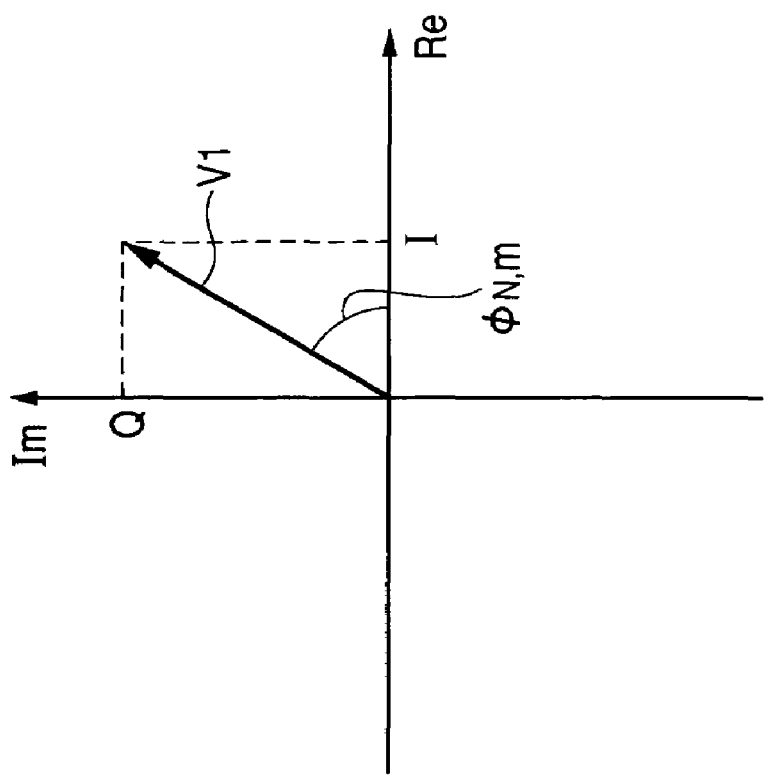
FIG. 14B is a graph schematically illustrating a standstill of the IQ vector illustrated in FIG. 14A.
Figure 14A:
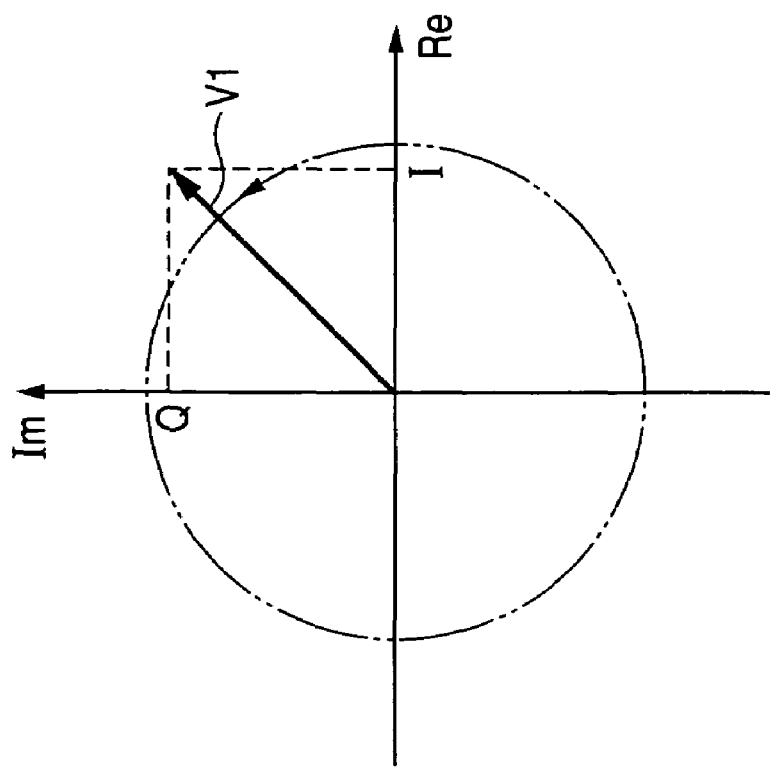
FIG. 14A is a graph schematically illustrating an IQ vector whose real and imaginary parts correspond to an in-phase component and a quadrature-phase component obtained by a quadrature detector illustrated in FIG. 13.

It is to be noted that the rate dϕ/dt of temporal change of the reference phase in the target standard wave is equivalent to a rotation velocity of a complex vector (IQ vector) V1 whose real and imaginary parts correspond to the in-phase component and the quadrature-phase component obtained by the quadrature detector 18 and shown on the rectangular coordinates illustrated in FIG. 14A. It is also to be noted that the horizontal axis (Re) represents the real part of the IQ vector V1, and the vertical axis (Im) represents the imaginary part of the IQ vector V1. The argument of the IQ vector V1 represents the phase $\phi_{N,m}$ of the target standard wave.

Minimization of an absolute value of the rate dϕ/dt of temporal change of the reference phase in the target standard wave means to slow the rotation velocity of the IQ vector V1 as much as possible, or ideally, to make the IQ vector V1 stand still (see FIG. 14B).

The rotation velocity of the IQ vector V1 corresponding to the rate dϕ/dt of temporal change of the reference phase in the target standard wave is proportional to the error ϵ of the second reference signal CK2. For this reason, the IQ vector V1 at standstill means the error ϵ of the second reference signal CK2 becomes zero, in other words, the clock frequency $f_s$ of the second reference signal CK2 is matched with the carrier frequency $f_c$ of the target carrier wave.

Specifically, while the frequency lock command is continuously input thereto, the PLL circuit 5 locks the clock frequency $f_s$ of the second reference signal CK2 to the carrier frequency $f_c$ of the target carrier wave based on the average of the phase-change amount $\Delta\phi_{N,m}$ as the physical quantity equivalent to the rate dϕ/dt of temporal change of the reference phase in the target standard wave.

In the radio-controlled device 1a according to the second embodiment, the error ϵ of the second reference signal CK2 can become low as much as possible. For this reason, the accuracy of a measured time by the time counter 8 corrected based on the demodulated time information can be boosted up to its maximum level. This allows an error of a measured time by the time counter 8 relative to a correct time to be kept small even if correction of a measured time by the time counter 8 has not been executed for a long period of time.

In the second embodiment, as the physical quantity equivalent to the rate dϕ/dt of temporal change of the reference phase in the target standard wave, the average of the phase-change amount $\Delta\phi_{N,m}$ is obtained, but the present invention is not limited to the structure.

Specifically, the rate dϕ/dt of temporal change of the reference phase in the target standard wave can be directly obtained based on, for example, tangents of regression lines of temporal distributions of the phase $\phi_{N,m}$ of the target standard wave. In this modification, as described above using the operations in FIGS. 9A and 9B, it is possible to:

extract absolute values of some pieces of the phase-change amount data $\Delta\phi_{N,m}$ that is not greater than the predetermined first extraction threshold from absolute values of the remaining pieces of the phase-change amount data $\Delta\phi_{N,m}$; and calculate tangents of linear regression lines of some of the pieces of the phase-change amount data $\Delta\phi_{N,m}$.

This allows a more precise rate of temporal change of the reference phase in the target standard wave to be obtained.

Third Embodiment

A radio-controlled device 1b according to a third embodiment of the present invention will be described hereinafter.

Figure 15:
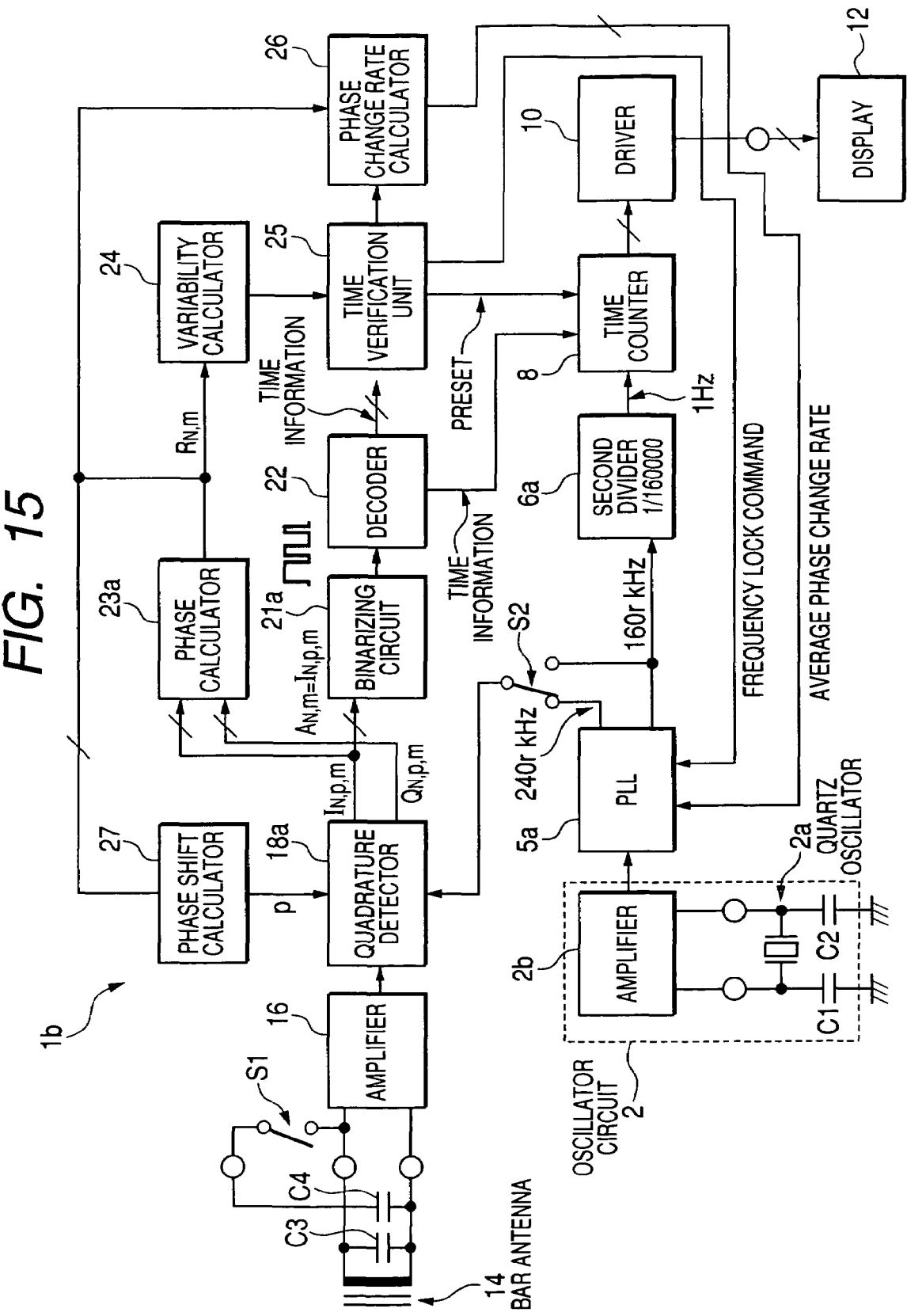
FIG. 15 is a block diagram schematically illustrates an example of the overall structure of a radio-controlled device according to a third embodiment to which the present invention is applied.

FIG. 15 schematically illustrates an example of the overall structure of the radio-controlled device 1b according to the third embodiment to which the present invention is applied.

Like reference characters are assigned to like parts in the radio-controlled devices according to the second and third embodiments. Descriptions of the like parts of the radio-controlled device according to the third embodiment will be therefore omitted, and different parts of the radio-controlled device according to the third embodiment from those according to the second embodiment will be described in detail hereinafter.

As illustrated in FIG. 15, a PLL circuit 5a is operative to execute the same operations as the first divider 4 to generate a first reference signal whose frequency is multiplication of the 40 kHz of the first longwave standard signal by r (an integer equal to or greater than 2). Similarly, the PLL circuit 5a is operative to execute the same operations as the first divider 4 to generate a second reference signal whose frequency is multiplication of the 60 kHz of the second longwave standard signal by r.

Specifically, the frequencies of the first and second reference signals according to the third embodiment are respectively set to the product of 160 kHz and r and that of 240 kHz and r, which are expressed by "160r kHz" and "240r kHz".

A second divider 6a according to the third embodiment is operative to receive one of the first and second reference signals and to divide it by a predetermined number depending on the received one of the first and second reference signals, thereby generating a time reference signal.

For example, in the first embodiment, the second divider 6a is operative to receive the first reference signal whose frequency is 160r kHz and to divide it by 160000r, thereby generating a time reference signal whose frequency of 1 kHz.

Figure 16:
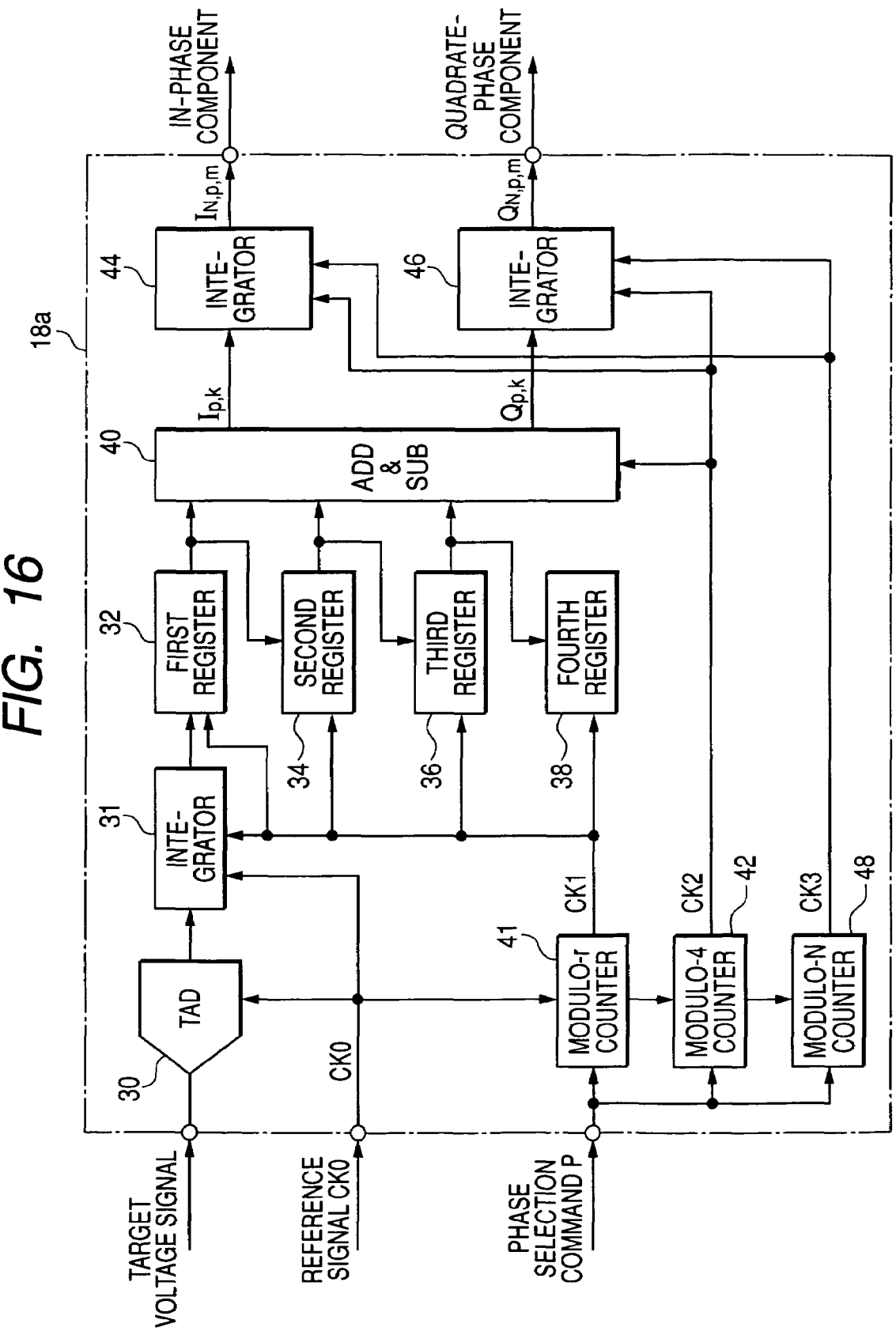
FIG. 16 is a block diagram schematically illustrating an example of the overall structure of a quadrature detector illustrated in FIG. 15.

Like the quadrature detector 18, as illustrated in FIG. 16, a quadrature detector 18a according to the third embodiment is composed of the TAD 30 operative to average (integrate) the amplified target voltage signal by the amplifier 16 over every cycle $T_b$, thereby obtaining an average value (integration value) $S_i$ (i=1, 2, 3, . . . ) every cycle $T_b$.

The cycle (sampling cycle) $T_b$ is equivalent to one cycle of one of the first and second reference signals whose frequencies are 160r kHz and 240r kHz selectively input via the switch S2 from the PLL circuit 5a. The sampling cycle $T_b$ is equivalent to one 4r-th the carrier cycle $T_c$ of the target carrier wave, which is given by "$T_b=T_c/4r$". In the third embodiment, one of the first and second reference signals to be selectively input from the PLL circuit 5a via the switch S2 will be referred to as "reference signal CK0" hereinafter.

In addition, the quadrature detector 18a is also composed of an integrator 31 connected to the TAD 30 and operative to integrate each group of an r number of sequential average values $S_i$ (i=1, 2, 3, . . . ) each obtained by the TAD 30 every cycle $T_b$ of the reference signal CK0.

The quadrature detector 18a is composed of first to fourth registers 32, 34, 36, and 38 each with an input and an output, and an adder-subtractor 40.

The input of the first register 32 is connected to an output of the integrator 31. Connections between the first to fourth registers 32 to 34 and between them and adder-subtractor 40 are substantially identical to those of the quadrature integrator 18.

The quadrature detector 18a is composed of a modulo-r counter 41 connected to the TAD 30, the integrator 31, and each of the first to fourth registers 32 to 38.

The modulo-r counter 41 is operative to count up from zero (initial value) in synchronization with a same-directed active edge, such as a riding edge or trailing edge, of each of the pulses of the reference signal CK0, and to reset its count value to zero in synchronization with the same-directed edge of the pulse immediately after the count value has reached r-1.

This allows generation of an operation clock CK1; this operation clock CK1 consists essentially of a repetitive series of clock pulses with a constant frequency that is one r-th the frequency $f_b$ ($=1/T_b$) of the reference signal CK0. The operation clock CK1 serves as an operation clock on which the integrator 31 and each of the first to fourth registers 32, 34, 36, and 38 operate. In other words, the clock cycle of the operation clock CK1 is equivalent to one quarter the carrier cycle $T_c$ of the target carrier wave.

The integrator 31 works to:

integrate the average values $S_i$ output from the TAD 30 in accordance with the following equation [16] each time a same-directed active edge, such as a riding edge or trailing edge, of a clock pulse of the reference signal CK0 is input thereto; and output the integrated result to the first register 32 each time a same-directed active edge, such as a riding edge or trailing edge, of a clock pulse of the reference signal CK1 is input thereto; this integrated result represents a signal $S_{p,q}$ obtained by averaging the target voltage signal over every cycle that is one quarter the carrier cycle $T_c$ of the target carrier wave:

$$S_{p,q} = \sum_{i=0}^{r-1} S_{p+(q-1)r+i} \qquad \text{[Equation 16]}$$

where p=1, 2, . . . , 4r, and q=1, 2, . . . .

The modulo-r counter 41, the modulo-4 counter 42, and the modulo-N counter 48 can be reset by a phase selection command to be output from a phase shift calculator 27 described hereinafter. This allows any one timing between 4r timings (1, 2, . . . , 4r) within one carrier cycle $T_c$ to be selected as a timing when the integrator 31 starts to integrate the average values $S_i$.

Figure 17:
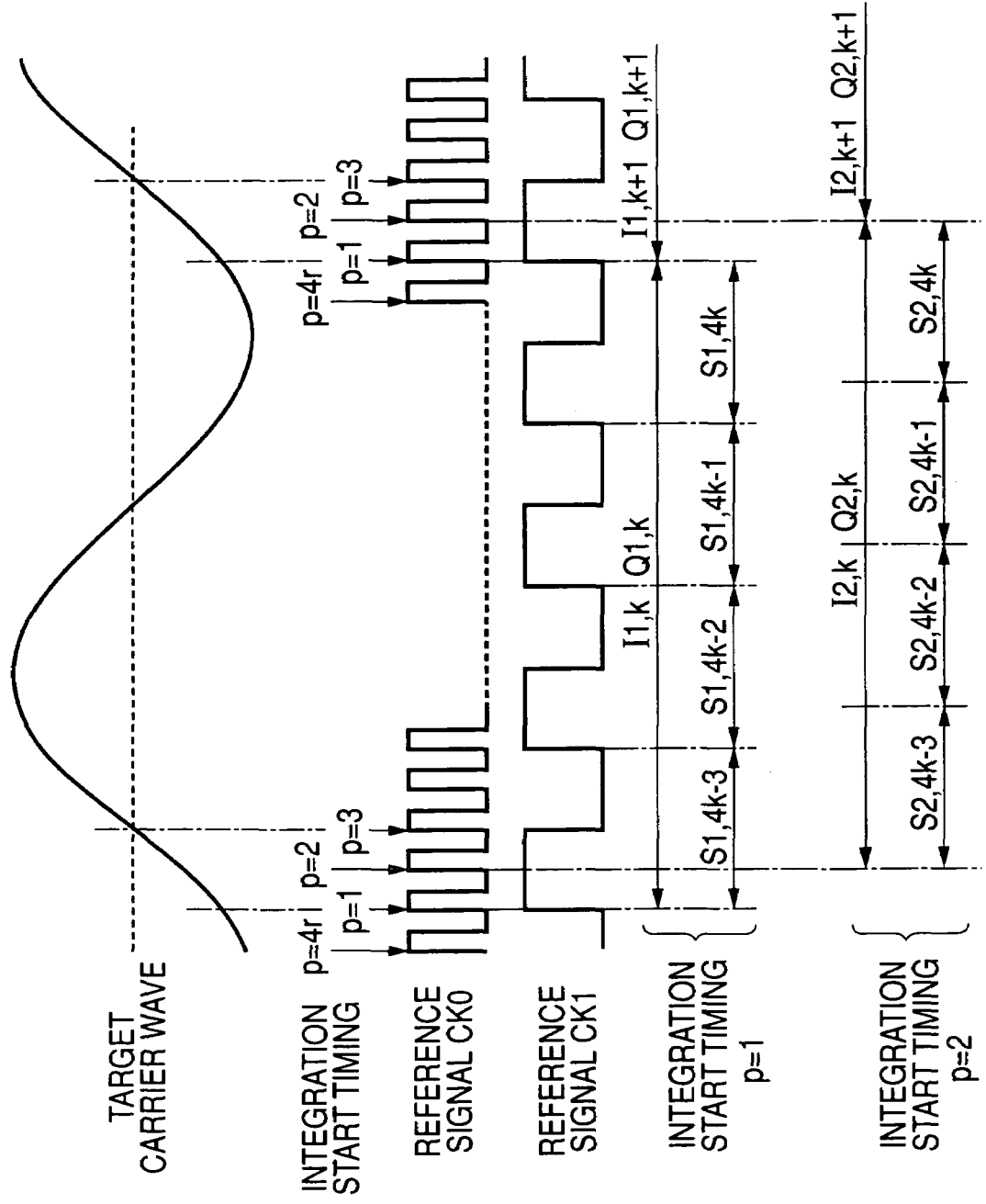
FIG. 17 is a timing chart schematically illustrating operations of the quadrature detector illustrated in FIG. 16.

In other words, the modulo-r counter 41, the modulo-4 counter 42, and the modulo-N counter 48 that are possible to be reset by the phase selection command allow any one timing between 4r timings (1, 2, . . . , 4r) within one carrier cycle $T_c$ to be selected as reference timing for calculating the in-phase component and quadrature-phase component of the target standard signal (see FIG. 17).

Operations of the first to fourth registers 32, 34, 36, and 38, the adder-subtractor 40, the first integrator 44, and the second integrator 46 of the quadrature detector 18a are substantially identical to those of corresponding components of the quadrature detector 18.

Specifically, the adder-subtractor 40 executes, in accordance with the following equations [17] and [18], addition and subtraction on each set of four average values $S_{p,4k-3}$, $S_{p,4k-2}$, $S_{p,4k-1}$, and $S_{p,4k}$ that have been sequentially output from the TAD 30 in synchronization with the reference signal CK1 and sequentially latched in the first to fourth registers 32, 34, 36, and 38.

The executed addition and subtraction in accordance with the equations [17] and [18] allows the in-phase component $I_{p,k}$ and the quadrature-phase component $Q_{p,k}$ of the target voltage signal $V_s$ to be obtained:

$$I_{p,k}=S_{p,4k-3}+S_{p,4k-2}-S_{p,4k-1}-S_{p,4k} \qquad \text{[Equation 17]}$$

$$Q_{p,k}=S_{p,4k-3}-S_{p,4k-2}-S_{p,4k-1}+S_{p,4k} \qquad \text{[Equation 18]}$$

where k=1, 2, 3, . . . , and p=1, 2, . . . , 4r.

The adder-subtractor 40 repeats the addition and subtraction on the set of four average values $S_{p,4k-3}$, $S_{p,4k-2}$, $S_{p,4k-1}$, and $S_{p,4k}$ in accordance with the equations [17] and [18] every cycle of the second reference signal CK2 corresponding to the carrier cycle $T_c$ of the target carrier wave.

Each of the first and second integrators 44 and 46 integrates:

each group of an N number of sequential in-phase components $I_{p,k}$ generated by the adder-subtractor 40 to obtain an in-phase integration value $I_{N,p,m}$(m=1, 2, 3, . . . ); this N is an integer equal to or greater than 1, and each group of an N number of sequential quadrature-phase components $Q_{p,k}$ generated by the adder-subtractor 40 to obtain a quadrature-phase integration value $Q_{N,p,m}$.

Specifically, the first integrator 44 integrates the in-phase components $I_{p,k}$ generated by the quadrature detector 18a in synchronization with a same-directed edge, such as leading edge or trailing edge, of each clock pulse of the second reference signal CK2 in accordance with the following equation [19], thereby obtaining the integration value $I_{N,p,m}$.

Similarly, the second integrator 46 integrates the quadrate-phase components $Q_{p,k}$ generated by the quadrature detector 18a in synchronization with a same-directed edge, such as leading edge or trailing edge, of each clock pulse of the second reference signal CK2 in accordance with the following equation [20], thereby obtaining the integration value $Q_{N,p,m}$.

$$I_{N,p,m} = \sum_{k=(m-1)N+1}^{mN} I_{p,k} \qquad \text{[Equation 19]}$$

$$Q_{N,p,m} = \sum_{k=(m-1)N+1}^{mN} Q_{p,k}$$ [Equation 20]

where m=1, 2, 3, . . . .

The first integrator 44 supplies the obtained integration value $I_{N,p,m}$ to a binarizing circuit 21a and a phase calculator 23a in synchronization with a same-directed edge, such as a rising edge or trailing edge, of each clock pulse of the operation clock CK3 output from the modulo-N counter 48.

Similarly, the second integrator 46 supplies the obtained integration value $Q_{N,m}$ to the binarizing circuit 21a and the phase calculator 23a in synchronization with a same-directed edge, such as a rising edge or trailing edge, of each clock pulse of the operation clock CK3 output from the modulo-N counter 48.

Specifically, the integration value $I_{N,p,m}$ obtained by the first integrator 44 in accordance with the equation [19] corresponds to the integration value obtained by integrating the in-phase component $I_{p,k}$ over every N number of carrier cycles $T_c$. Similarly, the integration value $Q_{N,p,m}$ obtained by the second integrator 46 in accordance with the equation [20] corresponds to the integration value obtained by integrating the quadrature-phase component $Q_{p,k}$ over every N number of carrier cycles $T_c$.

The integrating operations of the first and second integrators 44 and 46 allow the in-phase integration value $I_{N,p,m}$ and the quadrature-phase integration value $Q_{N,p,m}$ of the target voltage signal $V_s$ to be obtained without containing unnecessary signal components.

The binarizing circuit 21 binarizes the in-phase integration value data $I_{N,p,m}$, thereby generating binarized data.

The phase calculator 23a calculates an approximate value $R_{N,p,m}$ of a phase $\phi_{N,p,m}$ of the target standard wave based on the integration value $I_{N,p,m}$ and the integration value $Q_{N,p,m}$ supplied from the quadrature detector 18a in accordance with the following equation [21]:

$$R_{N,p,m} = \tan^{-1}\frac{Q_{N,p,m}}{I_{N,p,m}} = \tan\phi_{N,p,m}$$ [Equation 21]

Figure 18:
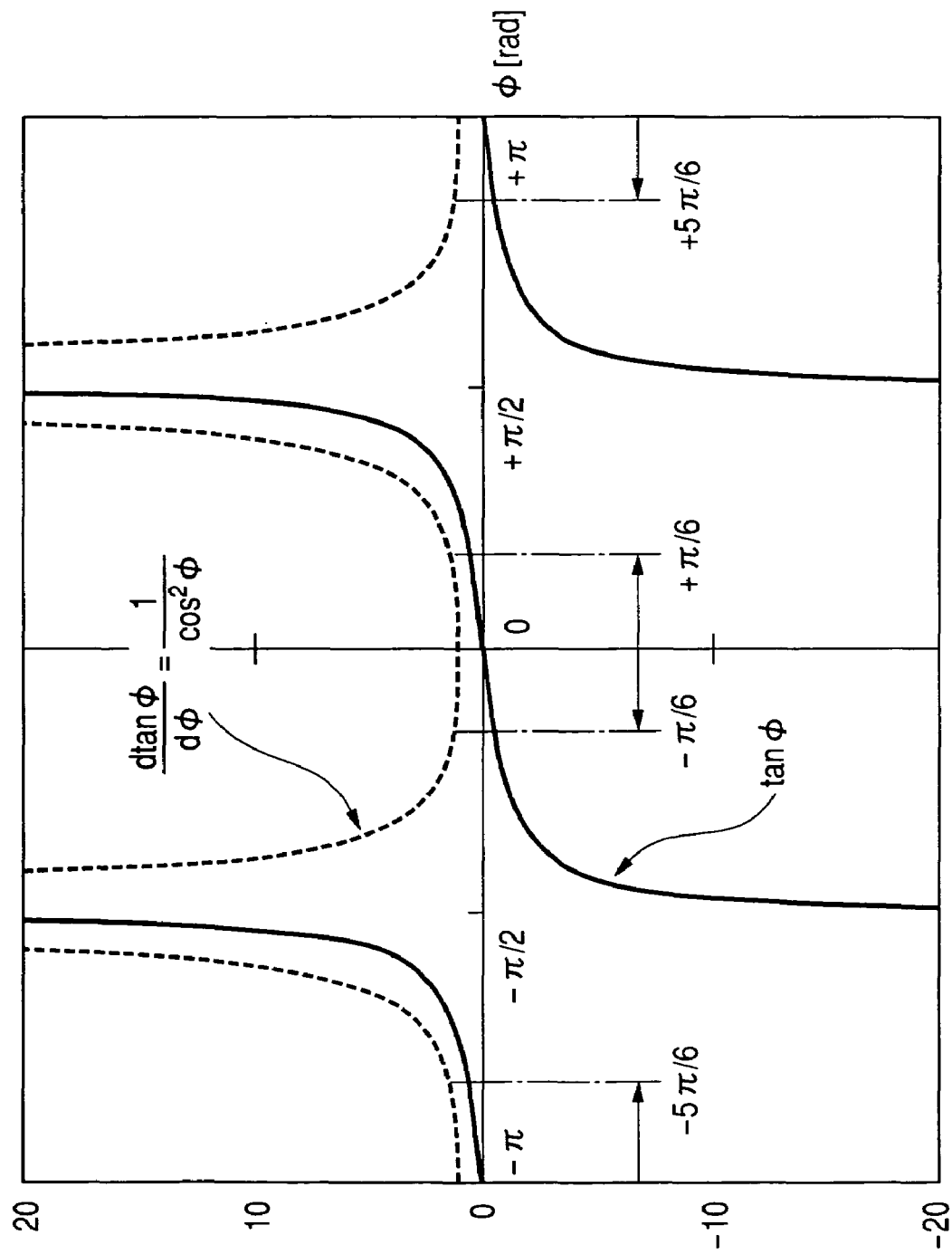
FIG. 18 is a graph schematically illustrating an example of $\tan \phi_{N,p,m}$ to be used as an approximate value of a phase of a target carrier wave and its gradient $d(\tan \phi_{N,p,m})/d \phi_{N,p,m}$.

FIG. 18 schematically illustrates an example of the tan $\phi_{N,p,m}$ to be used as the approximate value of the phase $\phi_{N,p,m}$ of the target standard wave and its gradient d(tan $\phi_{N,p,m}$)/d $\phi_{N,p,m}$.

As illustrated in FIG. 18, when the phase $\phi_{N,p,m}$ of the target standard wave lies within the range between the phase of $-\pi/6$ and the phase of $\pi/6$, the range lower than $-5\pi/6$, or the range higher than $5\pi/6$, the tan $\phi_{N,p,m}$ is proportional to the phase $\phi_{N,p,m}$ of the target standard wave. This is because, when the phase $\phi_{N,p,m}$ of the target standard wave lies within the range in which the tan $\phi_{N,p,m}$ is adequately small, the tan $\phi_{N,p,m}$ is approximately equal to sin $\phi_{N,p,m}$ and approximately equal to $\phi_{N,p,m}$.

The variability calculator 24 and the phase-change rate calculator 26 are configured to execute operations that are substantially identical to operations of them in the second embodiment using the approximate value $R_{N,p,m}$ in place of the phase $\phi_{N,p,m}$ of the target standard wave.

It is to be noted that, when the error $\epsilon$ of the second reference signal CK2 is assumed to be zero, the approximate value $R_{N,p,m}$ becomes constant as well as the phase $\phi_{N,p,m}$ of the target standard wave.

In contrast, when the error $\epsilon$ of the second reference signal CK2 is not assumed to be zero, as illustrated in FIG. 19A, the approximate value $R_{N,p,m}$ nonlinearly varies different from the variation in the phase $\phi_{N,p,m}$ of the target standard wave.

In a case where the error E of the second reference signal CK2 is not assumed to be zero, however, the approximate value $R_{N,p,m}$ is assumed to be equal to the phase $\phi_{N,p,m}$ of the target standard wave so that the approximate value $R_{N,p,m}$ substantially vary at a constant time-varying rate while:

the phase $\phi_{N,p,m}$ of the target standard wave lies below $-5\pi/6$, which is given by "$\phi N,p,m <-5\pi/6$", or above $5\pi/6$, which is given by "$\phi_{N,p,m} > 5\pi/6$", or an absolute value of the phase $\phi_{N,p,m}$ of the target standard wave lies below $\pi/6$, which is given by "$|\phi_{N,p,m}| < \pi/6$" (see FIGS. 18 and 19A).

Specifically, the approximate value $R_{N,p,m}$ can be treated equally as the phase $\phi_{N,p,m}$ of the target standard wave when the approximate value $R_{N,p,m}$ is assumed to substantially vary at a constant time-varying rate.

In addition, as well as the phase-change amount $\Delta\phi_{N,m}$, an amount $\Delta R_{N,m}$ of change in a currently calculated approximate value $R_{N,p,m}$ relative to a previously calculated approximate value $R_{N,p,m-1}$ can be sequentially calculated by, for example, the phase calculator 23a; this approximate-value change amount $\Delta R_{N,m}$ is expressed by the equation of "$\Delta R_{N,m} = R_{N,p,m} - R_{N,p,m-1}$".

In this case, as well as the operations in FIG. 10, some of approximate values $R_{N,p,m}$ are extracted from all of the approximate values $R_{N,p,m}$; absolute values of pieces of the approximate-value change amount $\Delta R_{N,m}$ corresponding to some of the extracted approximate values $R_{N,p,m}$ are not greater than a predetermined extraction threshold, and absolute values of some of the extracted approximate values $R_{N,p,m}$ lie within the range below $\pi/6$.

FIG. 19B schematically illustrates temporal distributions of some of the extracted approximate values $R_{N,p,m}$.

FIG. 19B clearly shows that regression lines of some of the extracted pieces of approximate values $R_{N,p,m}$ each has a substantially linear gradient.

Specifically, the extraction operation for the approximate values $R_{N,p,m}$ to be executed by the phase calculator 23a can eliminate:

some of the approximate values $R_{N,p,m}$ that are not assumed to substantially vary at a constant time-varying rate; and some of the approximate values $R_{N,p,m}$ that are affected by noise.

In this case, some of the extracted approximate values $R_{N,p,m}$ can be supplied to the variability calculator 24 and/or the phase change rate calculator 26.

Thereafter, in the variability calculator 24, as illustrated in FIG. 10, an extraction rate of some of the extracted pieces of the approximate values $R_{N,p,m}$ relative to all of the approximate values $R_{N,p,m}$ can be calculated (see step S21).

Next, the calculated extraction rate can be determined as the variability of the phase $\phi_{N,m}$ of the target standard wave (see step S22).

Moreover, in the phase change rate calculator 26, the rate of temporal change of the reference phase in the target standard wave can be obtained based on some of the extracted pieces of the approximate-value change amount data $\Delta R_{N,m}$ in place of the phase $\phi_{N,m}$ of the target standard wave.

The radio-controlled device 1b according to the third embodiment is also provided with a phase shift calculator 27 connected to the quadrature detector 18a and the phase calculator 23a.

The phase shift calculator 27 is operative to receive the approximate value $R_{N,p,m}$ generated by the phase calculator 23a, and to output a phase selection command based on the received approximate value $R_{N,p,m}$.

Specifically, the phase shift calculator 27 output, to the quadrature detector 18a, a phase selection command that permits the quadrature detector 18a to adjust the timing when the integrator 31 starts to integrate the average values $S_i$, in other words, the quadrature detector 18a starts to calculate the in-phase component and quadrature-phase component of the target standard signal, so that an absolute value of the approximate value $R_{N,m,p}$, becomes its lowermost value.

The phase select command allows the timing when the integrator 31 starts to integrate the average values $S_i$ to be desirably adjusted with high resolution of one 4r-th the carrier cycle of the target carrier wave.

Specifically, as described in the second embodiment, a complex vector (IQ vector) V2 whose real and imaginary parts correspond to the in-phase component and the quadrature-phase component obtained by the quadrature detector 18a and whose argument represents the phase $\phi_{N,p,m}$ of the target standard wave is assumed to rotate as a constant rotation velocity in FIG. 20A. The constant rotation velocity corresponds to the rate $d\phi/dt$ of temporal change of the reference phase in the target standard wave: this rate proportional to the error $\epsilon$.

The lock of the clock frequency $f_s$ of the second reference signal CK2 to the carrier frequency $f_c$ of the target carrier wave by the phase change rate calculator 26 and the PLL circuit 5a allows the IQ vector V2 to stand still (see FIG. 20B). This permits the approximate value $R_{N,p,m}$ obtained by the phase calculator 23a to become substantially constant.

Moreover, adjustment of the timing when the integrator 31 starts to integrate the average values $S_i$ so as to minimum the approximate value $R_{N,p,m}$ (tan $\phi_{N,p,m}$) allows the argument ($\phi_{N,p,m}$) of the IQ vector V2 to become substantially zero, so that the IQ vector V2 is adjusted to stand still close to the real part axis (horizontal axis) (see FIG. 20C).

FIG. 20C clearly shows that the quadrature-phase component of the IQ vector V2 obtained by the quadrature detector 18a gets close to zero. In other words, in the radio-controlled device 1b, the quadrature-phase component $Q_{N,p,m}$ generated by the quadrature detector 18a is assumed to be zero, and the in-phase component $I_{N,p,m}$ generated by the quadrature detector 18a is assumed to the amplitude $A_{N,m}$ of the target standard wave.

This allows the in-phase component $I_{N,p,m}$ of the target standard wave is directly assumed to the amplitude $A_{N,m}$ of the target standard wave. This makes it possible to omit the amplitude calculator 20 from the configuration of the radio-controlled device 1b.

As described above, in the radio-controlled device 1b according to the third embodiment, adjustment of the timing when the quadrature detector 18a starts to calculate the in-phase component and quadrature-phase component of the target standard signal permits the argument $\phi_{N,p,m}$ to approximately become zero. This makes it possible to directly use the in-phase component $I_{N,p,m}$ of the target standard wave as the amplitude $A_{N,m}$ thereof.

In addition, the radio-controlled device 1b according to the third embodiment allows the phase calculator 23a to obtain the approximate value $R_{N,p,m}$ (tan $\phi_{N,p,m}$ equivalent to "$Q_{N,p,m}/I_{N,p,m}$") in place of the phase $\phi_{N,p,m}$. This makes it possible to reduce the amount of calculations required to obtain the approximate value $R_{N,p,m}$ as compared with that of calculations required to obtain the phase $\phi_{N,p,m}$.

That is, the radio-controlled device 1b according to the third embodiment, can:

omit a circuit for obtaining an amplitude of the target standard wave based on the in-phase component $I_{N,p,m}$ and the quadrature-phase component $Q_{N,p,m}$ generated by the quadrature detector 18a; and simplify the circuit structure of the phase calculator 23a because it is unnecessary to obtain the phase $\phi_{N,p,m}$.

Accordingly, it is possible to downsize the radio-controlled device 1b.

In each of the first and second embodiments, the amplitude calculator 20 is configured to calculate the amplitude of $A_{N,m}$ of a target standard wave in accordance with the equation [5], but the present invention is not limited to the structure.

Specifically, in place of the amplitude of $A_{N,m}$, the amplitude calculator 20 can be configured to calculate the second power $A_{N,m}^2$ of the amplitude $A_{N,m}$ of a target standard wave in accordance with the equation [22]:

$$A_{N,m}^2 = I_{N,m}^2 + Q_{N,m}^2 \qquad \text{[Equation 22]}$$

In addition, in place of the amplitude of $A_{N,m}$ the amplitude calculator 20 can be configured to calculate an approximate value $A_{N,m}'$ of the amplitude $A_{N,m}$ of a target standard wave in accordance with the equation [23]:

$$A_{N,m}' = \max(|I_{N,m}|, |Q_{N,m}|) + |I_{N,m}|) + |Q_{N,m}| \qquad \text{Equation 23]}$$

Especially, use of the equation [23] to obtain the approximate value $A_{N,m}'$ of the amplitude $A_{N,m}$ of a target standard wave allows elimination of square root operation and multiplication, making it possible to simplify the configuration of the amplitude calculator 20.

It is to be noted that the second power $A_{N,m}^2$ and the approximate value $A_{N,m}'$ to be respectively calculated in accordance with the equations [22] and [23] do not strictly represent the amplitude $A_{N,m}$ of a target standard wave with accuracy. In each of the first and second embodiments, the amplitude $A_{N,m}$ of a target standard wave is mainly configured to be binarized in order to demodulate the time information from the target voltage signal.

Accordingly, the differences between the amplitude $A_{N,m}$ of a target standard wave and each of the second power $A_{N,m}^2$ and the approximate value $A_{N,m}'$ give rise to no practical problems.

In each of the second and third embodiments, the PLL circuit 5 (5a) is used to adjust the frequency of a reference signal CK1, but the present invention is not limited to the structure.

Specifically, in order to adjust the frequency of a reference signal CK1, it is possible to control the ratio of division of the alternating signal generated by the oscillator circuit 2, or to control the capacitances of the capacitors C1 and C2 of the oscillator circuit 2.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A radio-controlled device for measuring time, the radio-controlled device comprising:

a reference signal generator configured to generate a cyclic reference signal;

a time measuring unit configured to measure a time based on a frequency of the generated cyclic reference signal;

a receiving unit configured to receive, as a target electric signal, a target radio wave on which time information indicative of an official time standard is superimposed, the target radio wave being generated by amplitude modulating a target carrier wave with the time information;

a quadrature detector configured to extract an in-phase component and a quadrature-phase component of the target radio wave from the received target electric signal every a period of time corresponding to at least one cycle of the reference signal;

a demodulating unit configured to demodulate the time information from the received electric signal based on amplitude information of the target radio wave, the amplitude information being obtained from the in-phase component and the quadrature-phase component of the target radio wave;

a phase calculator configured to calculate phase data associated with a phase of the target radio wave based on the in-phase component and the quadrature-phase component calculated every the period of time;

a variability calculator configured to calculate a variability of the calculated phase data of the target radio wave relative to a reference phase, the reference phase changing at a constant rate in time according to a frequency error, the frequency error being contained in the reference signal relative to a frequency of the target carrier wave; and a reception determining unit configured to determine whether reception of the radio-controlled device is good based on the calculated variability.

2. A radio-controlled device according to claim 1, wherein the time information is superimposed on the target radio wave in frame, and the reception determining unit is configured to determine whether the calculated variability is equal to or less than a predetermined threshold tolerance, further comprising:

a time correcting unit configured to:
  verify the demodulated time information in frame to determine whether the demodulated time information is proper; and
  correct the demodulated time information when it is determined that the calculated variability is equal to or less than the predetermined threshold tolerance, and that the demodulated time information is proper.

3. A radio-controlled device according to claim 1, wherein the variability calculator is configured to perform:

a first process to calculate an amount of change in a first piece of the phase data currently calculated by the phase calculator relative to a second piece of the phase data, the second piece of the phase data being calculated by the phase calculator the period of time before the currently calculated first piece of the phase data;

a second process to obtain, as the variability, statistical data of the calculated change amount of the first piece of the phase data over a predetermined period of time; and a third process to compare the obtained variability of the first piece of the phase data with the tolerance threshold to determine whether the obtained variability of the first piece of the phase data is equal to or less than the threshold tolerance.

4. A radio-controlled device according to claim 3, further comprising a tolerance threshold setting unit configured to:

repeat the first and second processes while changing reception of the radio-controlled device on the target radio wave to obtain items of the variability;

compare the obtained items of the variability with each other to determine an upper limit item of the variability in the obtained items; and set the upper limit item of the variability in the obtained items as the tolerance threshold.

5. A radio-controlled device according to claim 1, further comprising a time-change rate calculator configured to calculate a rate of time change in the reference phase based on pieces of the phase data calculated by the phase calculator over a period of time, wherein the reference signal generator is configured to adjust the frequency of the reference signal so as to minimize the rate of time change in the reference signal.

6. A radio-controlled device according to claim 1, wherein the quadrature detector comprises:

an integrator configured to integrate the received electric signal over every quarter of one cycle of the target radio wave to generate an integration value, the integration values to be generated being represented as S1, S2, S3, S4, . . . ; and a calculating unit configured to perform addition and subtraction on the generated integration values in accordance with the following equations to respectively calculate first components and second components:

$$I_k = S_{4k-3} + S_{4k-2} - S_{4k-1} - S_{4k}$$

$$Q_k = S_{4k-3} - S_{4k-2} - S_{4k-1} + S_{4k}$$

where $I_k$ represents the first components, the $Q_k$ represents the second components, and k=1, 2, 3, . . . ; and an integrator configured to:
  integrate each group of an N number of the first components $I_k$ in accordance with the following equation to obtain the in-phase component $I_{N,m}$ $$I_{N,m} = \sum_{k=(m-1)N+1}^{mN} I_k$$

where m=1, 2, 3, . . . ; and integrate each group of an N number of the second components $Q_k$ in accordance with the following equation to obtain the quadrature-phase component $Q_{N,m}$:

$$Q_{N,m} = \sum_{k=(m-1)N+1}^{mN} Q_k$$

7. A radio-controlled device according to claim 6, wherein the integrator comprises:

a pulse delay circuit composed of a plurality of delay units serially connected to one another to form a plurality of stages of delay such that the received electric signal is supplied to each of the delay units, when a pulse is input to the plurality of delay units, the plurality of delay units sequentially transferring a pulse signal while delaying it, a delay time of the pulse signal by each of the delay units depending on a level of the received electric signal supplied thereto; and a counter unit configured to count what number of stages through which the pulse signal passes every timing of quarter of one cycle of the target radio wave to obtain the count value as the integration value.

8. A radio-controlled device according to claim 1, wherein the quadrature detector is configured to start to extract, at a timing, the in-phase component and the quadrature-phase component from the received target electric signal every the period of time, the timing being associated with the reference signal, further comprising:
- a timing adjusting unit operatively connected to the quadrature detector and configured to adjust the timing so as to minimize the phase data calculated by the phase calculator every the period of time,
- the demodulating unit being configured to use the in-phase component of the target radio wave as the amplitude information.

9. A radio-controlled device according to claim 8, the quadrature detector comprises:
- an integrator configured to integrate the received electric signal over every an integer submultiple of one cycle of the target radio wave to generate an integration value, the integration values to be generated being represented as S1, S2, S3, S4, . . . , the integer being the product of 4 and r, the r being a positive integer;
- a timing-variable integrating unit configured to start to integrate, at a timing, the integration values S1, S2, S3, S4, . . . in accordance with the following equation so as to generate an integrated signal every quarter of one cycle of the target radio wave, the timing being selected from a submultiple of the product of 4 and r, the submultiple being expressed by p, the timing-variable integrating unit being configured to allow change of the timing in accordance with a command, the command being configured to be sent from the timing adjusting unit:

$$S_{p,q} = \sum_{i=0}^{r-1} S_{p+(q-1)r+i}$$

where p=1, 2, . . . , 4r, q=1, 2, . . . ;
- a calculating unit configured to perform addition and subtraction on the generated signals $S_{p,q}$ in accordance with the following equations to calculate first components and second components:

$$I_{p,k} = S_{p,4k-3} + S_{p,4k-2} - S_{p,4k-1} - S_{p,4k}$$

$$Q_{p,k} = S_{p,4k-3} - S_{p,4k-2} - S_{p,4k-1} + S_{p,4k}$$

where $I_{p,k}$ represents the first components, the $Q_{p,k}$ represents the second components, and k=1, 2, 3, . . . ; and
- an integrator configured to:
  - integrate each group of an N number of the first components $I_{p,k}$ in accordance with the following equation to obtain the in-phase component $I_{N,p,m}$:

$$I_{N,p,m} = \sum_{k=(m-1)N+1}^{mN} I_{p,k}$$

where m=1, 2, 3, . . . ; and
  - integrate each group of an N number of the second components $Q_{p,k}$ in accordance with the following equation to obtain the quadrature-phase component $Q_{N,p,m}$:

$$Q_{N,p,m} = \sum_{k=(m-1)N+1}^{mN} Q_{p,k}$$

10. A radio-controlled device according to claim 9, wherein the integrator comprises:
- a pulse delay circuit composed of a plurality of delay units serially connected to one another to form a plurality of stages of delay such that the received electric signal is supplied to each of the delay units, when a pulse is input to the plurality of delay units, the plurality of delay units sequentially transferring a pulse signal while delaying it, a delay time of the pulse signal by each of the delay units depending on a level of the received electric signal supplied thereto; and
- a counter unit configured to count what number of stages through which the pulse signal passes every timing of an integer submultiple of one cycle of the target radio wave, the integer being the product of 4 and r, the r being a positive integer to obtain the count value as the integration value.

11. A radio-controlled device according to claim 1, wherein the phase calculator is configured to calculate, as the phase data, an approximate value of the phase of the target radio wave based on the in-phase component and the quadrature-phase component calculated every the period of time, the approximate value being expressed by a ratio of the quadrature-phase component to the in-phase component.

12. A radio-controlled device according to claim 1, wherein, as the amplitude information of the target radio wave, any one of a second power and an approximate value of an amplitude of the target radio wave is obtained from the in-phase component and the quadrature-phase component of the target electric signal.

13. A method of measuring time based on a target radio wave on which time information indicative of an official time standard is superimposed, the target radio wave being generated by amplitude modulating a target carrier wave with the time information, the method comprising:
- generating a cyclic reference signal;
- measuring a time based on a frequency of the generated cyclic reference signal;
- receiving, as a target electric signal, the target radio wave;
- extracting an in-phase component and a quadrature-phase component of the target radio wave from the received target electric signal every a period of time corresponding to at least one cycle of the reference signal;
- demodulating the time information from the received electric signal based on amplitude information of the target radio wave, the amplitude information being obtained from the in-phase component and the quadrature-phase component of the target radio wave;
- calculating phase data associated with a phase of the target radio wave based on the in-phase component and the quadrature-phase component calculated every the period of time;
- calculating a variability of the calculated phase data of the target radio wave relative to a reference phase, the reference phase changing at a constant rate in time according to a frequency error, the frequency error being contained in the reference signal relative to a frequency of the target carrier wave; and
- determining whether reception of a radio-controlled device is good based on the calculated variability.

* * * * *